US009111387B2

(12) United States Patent
Miki et al.

(10) Patent No.: US 9,111,387 B2
(45) Date of Patent: Aug. 18, 2015

(54) COLOR INFORMATION GENERATION DEVICE, COLOR INFORMATION GENERATION METHOD, AND RECORDING MEDIUM

(75) Inventors: Manabu Miki, Nara (JP); Junichiro Nishi, Hyogo (JP)

(73) Assignee: VIVA COMPUTER CORPORATION, Osaka (JP)

( * ) Notice: Subject to any disclaimer, the term of this patent is extended or adjusted under 35 U.S.C. 154(b) by 230 days.

(21) Appl. No.: 13/823,888

(22) PCT Filed: Sep. 16, 2010

(86) PCT No.: PCT/JP2010/005660
§ 371 (c)(1),
(2), (4) Date: Mar. 15, 2013

(87) PCT Pub. No.: WO2012/035582
PCT Pub. Date: Mar. 22, 2012

(65) Prior Publication Data
US 2013/0176325 A1    Jul. 11, 2013

(51) Int. Cl.
*G06T 11/20* (2006.01)
*G06T 11/00* (2006.01)

(52) U.S. Cl.
CPC ............. *G06T 11/203* (2013.01); *G06T 11/001* (2013.01); *G06T 11/206* (2013.01)

(58) Field of Classification Search
CPC ...................................................... G06K 9/36
USPC ........................................................ 345/589
See application file for complete search history.

(56) References Cited

U.S. PATENT DOCUMENTS

| 4,169,285 | A  | * | 9/1979  | Walker    | 345/591 |
| 6,172,681 | B1 | * | 1/2001  | Ueda      | 345/589 |
| 2005/0057559 | A1 | * | 3/2005 | Komarechka | 345/418 |
| 2005/0069203 | A1 | * | 3/2005 | Khomo     | 382/186 |
| 2009/0097760 | A1 | * | 4/2009 | Bezryadin | 382/232 |
| 2009/0285505 | A1 | * | 11/2009 | Mihara et al. | 382/284 |

FOREIGN PATENT DOCUMENTS

JP    2-103160       4/1990
JP    2000-311239    11/2000
(Continued)

OTHER PUBLICATIONS

International Search Report issued Nov. 16, 2010 in corresponding International Application No. PCT/JP2010/005660.

*Primary Examiner* — Kee M Tung
*Assistant Examiner* — Grace Q Li
(74) *Attorney, Agent, or Firm* — Li & Cai Intellectual Property (USA) Office

(57) ABSTRACT

A color database, in which a mutual correlation is established among an L*a*b*-color-system L*a*b* value as an attribute with respect to a color stimulus, an RGB value, and a sphere radius which is proportional to a color difference and is set in advance as a value indicating a level at that a person can sensuously distinguish between colors, the sphere radius being a radius of a color sphere having the L*a*b* value as a center point in an L*a*b*-color-system color solid, is included, and when the L*a*b* value or RGB value is input to an input unit, display data generation unit refers to the color database to generate display data in which the color sphere having a center point of the L*a*b* value or the L*a*b* value correlated with RGB value is disposed in the L*a*b*-color-system color solid of a line drawing, the color sphere having the correlated sphere radius.

6 Claims, 21 Drawing Sheets

(56) References Cited

FOREIGN PATENT DOCUMENTS

| JP | 2000-314663 | 11/2000 | | |
| JP | 2006-33196 | 2/2006 | | |
| WO | WO2007/137621 | * 12/2007 | ............... | H04N 1/60 |

* cited by examiner

Fig.4

| COLOR NUMBER | COLOR NAME | L*a*b* VALUES | | | HVC VALUE | | | XYZ VALUES | | | RGB VALUES | | | SPHERE RADIUS |
|---|---|---|---|---|---|---|---|---|---|---|---|---|---|---|
| | | L* | a* | b* | H | V | C | X | Y | Z | R | G | B | |
| 1 | CARROT ORANGE | 50.99 | 44.26 | 41.09 | 9.9R | 5 | 11.1 | 28.1 | 19.3 | 5.6 | 200 | 86 | 56 | 0.2 |
| 2 | BURNT SIENNA | 46.33 | 31.97 | 25.8 | 0.1YR | 4.5 | 7.5 | 20.7 | 15.5 | 7.4 | 167 | 87 | 70 | 0.2 |
| 3 | DIRTY-YELLOW RED | 53.18 | 29.5 | 15.32 | 7.5R | 5.2 | 6.43 | 26.8 | 21.2 | 15.3 | 180 | 106 | 102 | 0.2 |
| 4 | LIP COLOR A | 46.38 | 40.16 | 19.77 | 6.2R | 4.5 | 8.8 | 22.4 | 15.6 | 9.2 | 176 | 80 | 80 | 0.2 |
| 5 | LIP COLOR B | 41.52 | 27.74 | 12.38 | 6.6R | 4.1 | 5.7 | 15.9 | 12.2 | 8.9 | 144 | 80 | 80 | 0.2 |
| 6 | LIP COLOR C | 40.92 | 24.75 | 32.25 | 4.0YR | 4 | 7.2 | 15.0 | 11.8 | 3.9 | 144 | 80 | 48 | 0.2 |
| 7 | LIP COLOR D | 57.89 | 35.05 | 35.38 | 1.2YR | 5.7 | 9.2 | 33.6 | 25.8 | 10.6 | 208 | 112 | 80 | 0.2 |
| 8 | LIP COLOR E | 53.68 | 22.16 | 29.23 | 4.3YR | 5.2 | 6.4 | 25.5 | 21.7 | 10.2 | 176 | 112 | 80 | 0.2 |
| 9 | LIP COLOR F | 52.23 | 54.08 | 9.44 | 0.6R | 5.1 | 11.7 | 32.1 | 20.3 | 17.7 | 208 | 80 | 112 | 0.2 |
| 10 | LIP COLOR G | 51.53 | 51.41 | 27.46 | 6.2R | 5 | 11.7 | 30.5 | 19.7 | 9.6 | 208 | 80 | 80 | 0.2 |

COLOR INFORMATION GENERATION DEVICE, COLOR INFORMATION GENERATION METHOD, AND RECORDING MEDIUM

CROSS-REFERENCE TO RELATED APPLICATIONS

This application is a U.S. national phase application of PCT International Patent Application No. PCT/JP2010/005660 filed Sep. 16, 2010, which is incorporated by reference herein in its entirety.

TECHNICAL FIELD

The present invention relates to a color information generation device, a color information generation method, and the like, for generating and displaying display data for displaying color attribute information.

BACKGROUND ART

Nowadays the need to properly manage a color according to the intended use increases in various industrial fields. Conventionally, there is well known a method for managing the color using a color chart produced in each industrial field, a JIS standard color chart, a JIS systematic color name, or a table indicating the JIS systematic color name.

FIG. 21 illustrates a JIS systematic color name table 100 in which the JIS systematic color name is displayed. The JIS systematic color name table 100 displays plural JIS systematic color names 101, a vertical direction indicates lightness of a Munsell color system, and a horizontal direction indicates chroma of the Munsell color system. A color area 102 of the JIS systematic color name 101 is defined in the JIS systematic color name table 100 based on the lightness and the chroma. For example, the color area 102 of the JIS systematic color name 101 that is of "dull yellow red" has a rectangular shape in which a chroma direction is longer than a lightness direction.

A color range of the individual color chart in a color solid cannot be understood in the color chart, a distribution in the color solid cannot be understood in a JIS common color, and a Munsell color system is divided into the total of 350 blocks by dividing a 360-degree hue circle into areas by 25 vertical sectional views of the lightness and chroma as seen in the JIS systematic color name table 100. However, the hue circle is unclearly divided into the areas by the sectional views, and the color that is originally a gradation is divided into blocks. Therefore, the systematic color name on a boundary line between the blocks is unclear.

For example, there is well known a color solid display device that can understand a color distribution using a vertical section or a horizontal section in the Munsell color system (for example, see JP Laid-open H2-103160). For example, there is well known a display device that displays a color name and color gradation using a perspective sectional view of a Munsell color solid (for example, see Patent JP Laid-open 2000-311239).

SUMMARY OF THE INVENTION

Problems to be Solved by the Invention

In the technology disclosed in JP Laid-open H2-103160, although the color distribution corresponding to the vertical section or horizontal section can separately be understood, the color distribution corresponding to the vertical section or horizontal section cannot simultaneously be understood.

In the technology disclosed in JP Laid-open 2000-311239, the color gradation is displayed at predetermined lightness, but the gradations of the plural colors having different lightness are not simultaneously displayed.

Color management, in which an L*a*b* color system that is of a uniform color space having a strict perceptual difference is used widespread in industrial products. However, the L*a*b* color system differs from the Munsell color system, which mainly becomes widespread in design and educational fields and corresponds to the common color and the systematic color, in an expression form. Therefore, unfortunately a correlation between a language and perception is hardly understood.

In view of the foregoing, an object of the present invention is to provide a color information generation device and a color information generation method, in which a spatial characteristic with respect to the color attribute can easily be understood by sterically displaying the color attribute information.

Means for Solving the Problems

To solve the above problem, the $1^{st}$ aspect of the present invention is a color information generation device comprising:

a color database in which a mutual correlation is established among an L*a*b*-color-system L*a*b* value as an attribute with respect to a color stimulus, an RGB value as an attribute with respect to a computer color, and a sphere radius which is proportional to a color difference and is set in advance as a value indicating a level at that a person can sensuously distinguish between colors, the sphere radius being a radius of a color sphere having the L*a*b* value as a center point in an L*a*b*-color-system color solid;

an input unit to which the L*a*b* value or the RGB value is input; and a display data generation unit which refers to the color database to generate display data in which the color sphere having a center point of the L*a*b* value that is input to the input unit or the L*a*b* value correlated with the RGB value that is input to the input unit is disposed in the L*a*b*-color-system color solid of a line drawing, the color sphere having the correlated sphere radius and being colored at least on a surface.

The $2^{nd}$ aspect of the present invention is the color information generation device according to the $1^{st}$ aspect of the present invention, wherein in the color database, an attribute with respect to one or a plurality of colors, which is selected from a group of a color name, a color number, an XYZ-color-system XYZ value and a Munsell-color-system HVC value, is correlated with the L*a*b* value or the RGB value, and any attribute of the attributes with respect to the color is input to the input unit.

The $3^{rd}$ aspect of the present invention is the color information generation device according to the $1^{st}$ or the $2^{nd}$ aspect of the present invention, wherein the sphere radius of the color database is rewritten to a value of a sphere radius which is newly input to the input unit.

The $4^{th}$ aspect of the present invention is the color information generation device according to any one of the $1^{st}$ to the $3^{rd}$ aspect of the present invention, comprising:

a display unit which displays the display data generated by the display data generation unit.

The 5$^{th}$ aspect of the present invention is the color information generation device according to the 4$^{th}$ aspect of the present invention, wherein an inside of the color sphere generated by the display data generation unit is colored.

The 6$^{th}$ aspect of the present invention is the color information generation device according to the 5$^{th}$ aspect of the present invention, wherein the display data generation unit forms a tentative color sphere having the sphere radius with the center point, converts the plural RGB values, which are between a predetermined lower limit value or more and a predetermined upper limit value or less, into the L*a*b* values respectively, judges whether the converted L*a*b* values exist within the tentative color sphere respectively or not, and sets a cluster of the L*a*b* values which exist within the tentative color sphere as display data of the color sphere.

The 7$^{th}$ aspect of the present invention is the color information generation device according to the 4$^{th}$ aspect of the present invention, comprising:

a color difference calculation unit which calculates a color difference between two pieces of the color spheres, wherein in case an instruction for calculating a distance between a first color sphere and a second color sphere is input to the input unit, when the display unit is displaying the L*a*b*-color-system color solid, the first color sphere as the color sphere, and the second color sphere as the color sphere, the color difference calculation unit calculates a distance between the center point of the first color sphere and the center point of the second color sphere as the color difference between the first color sphere and the second color sphere.

The 8$^{th}$ aspect of the present invention is the color information generation device according to any one of the 1$^{st}$ to 7$^{th}$ aspect of the present invention, wherein The display data generation unit specifies any one of an L*a* section, an L*b* section, and an a*b* section as a projection section, and generates display data in which a projection color sphere is disposed on the projection section by projecting one or a plurality of the color spheres to the projection section.

The 9$^{th}$ aspect of the present invention is the color information generation device according to the 8$^{th}$ aspect of the present invention, wherein When two or more pieces of the projection color spheres are disposed on the projection section, the display data generation unit generates a display data which indicates a vector that is oriented to another one of the projection color spheres from one of the projection color spheres.

The 10$^{th}$ aspect of the present invention is the color information generation device according to the 6$^{th}$ aspect of the present invention, wherein in the color database, an attribute with respect to one or a plurality of colors, which is selected from a group of a color name, a color number, XYZ values of an XYZ-color-system and HVC values of a Munsell-color-system, is correlated with the L*a*b* value or the RGB value, and the display data generation unit converts each of the L*a*b* values which are judged to exist within the tentative color sphere into another attribute, and generates display data in which the converted attribute is disposed in a color-system color solid with respect to the attribute.

The 11$^{th}$ aspect of the present invention is the color information generation device according to the 6$^{th}$ aspect of the present invention, wherein in the color database, a Munsell-color-system HVC value as an attribute with respect to color is correlated with the L*a*b* value or the RGB value, and the display data generation unit converts the L*a*b* values which are judged to exist within the tentative color sphere into the HVC values respectively, makes a color oval sphere of a cluster of the converted HVC values, and generates display data in which the color oval sphere is disposed in a Munsell-color-system color solid.

The 12$^{th}$ aspect of the present invention is the color information generation device according to the 11$^{th}$ aspect of the present invention, comprising:

a color difference calculation unit which calculates a color difference between two pieces of the color spheres, wherein in case an instruction for calculating a distance between a first color oval sphere and a second color oval sphere is input to the input unit, when the display unit is displaying the Munsell-color-system color solid, the first color oval sphere as the color oval sphere, and a second color oval sphere as the color oval sphere, the color difference calculation unit converts a HVC value of a center point of the first color oval sphere and a HVC value of a center point of the second color oval sphere into L*a*b* values respectively, and calculates a distance between the two L*a*b* values as the color difference between the first color oval sphere and the second color oval sphere.

The 13th aspect of the present invention is the color information generation device according to the 10$^{th}$ aspect of the present invention, wherein a color-system color solid, which is displayed by the display unit, with respect to the converted attribute can be rotated and zoomed.

The 14$^{th}$ aspect of the present invention is the color information generation device according to the 2$^{nd}$ aspect of the present invention, comprising:

an attribute calculation unit which has a conversion equation that makes another one of the attributes from any one of the attributes, and makes the another one of the attributes using the conversion equation when the any one of the attributes is input to the input unit, the another one of the attributes corresponding to the any one of the attributes.

The 15$^{th}$ aspect of the present invention is a color information generation method comprising:

an inputting step of inputting an L*a*b*-color-system L*a*b* value as an attribute with respect to a color stimulus or an RGB value as an attribute with respect to a computer color;

a display data generating step of referring to a color database in which a mutual correlation is established among the L*a*b*-color-system L*a*b* value, the RGB value, and a sphere radius which is proportional to a color difference and is set in advance as a value indicating a level at that a person can sensuously distinguish between colors, the sphere radius being a radius of a color sphere having the L*a*b* value as a center point in an L*a*b*-color-system color solid, and generating display data in which the color sphere having a center point of the L*a*b* value that is input to the input unit or the L*a*b* value correlated with the RGB value that is input to the input unit is disposed in the L*a*b*-color-system color solid of a line drawing, the color sphere having the correlated sphere radius and being colored at least on a surface.

The 16$^{th}$ aspect of the present invention is a recording medium which has recorded a program, that causes a computer to perform at least the inputting step and the display data generating step of the color information generation method according to the 15$^{th}$ aspect of the present invention, and can be processed by a computer.

The 1$^{st}$ aspect of the invention which relates to the present invention is a program which causes a computer to perform at least the inputting step and the display data generating step of the color information generation method according to the 15th aspect of the present invention.

Effects of the Invention

The present invention can provide the color information generation device and color information generation method, in which the spatial characteristic of the color attribute can easily be understood by sterically displaying the color attribute information.

BRIEF DESCRIPTION OF THE DRAWINGS

FIG. 4 is a configuration diagram of a color database according to the embodiment of the present invention.

EMBODIMENTS OF THE INVENTION

Hereinafter, an embodiment of the present invention will be described with reference to the drawings.

Figure 1:
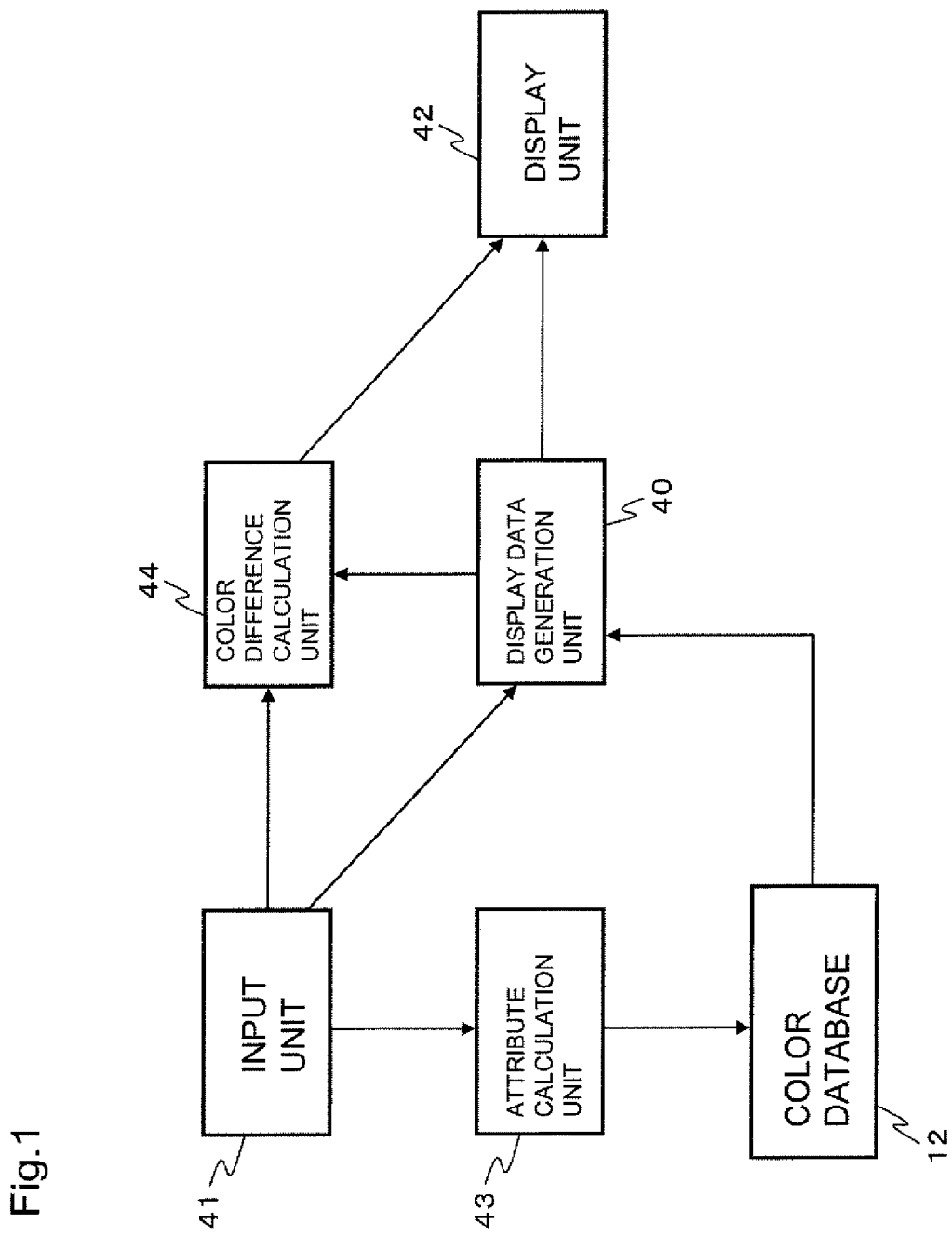
FIG. 1 is a block diagram illustrating a functional configuration of a color information generation device according to an embodiment of the present invention.

FIG. 1 is a functional block diagram illustrating a color information generation device according to an embodiment of the present invention.

The color information generation device of the embodiment includes a color database 12 that retains attribute information. As used herein, the attribute information means a color name, an L*a*b*-color-system L*a*b* value, a Munsell-color-system HVC value, an XYZ-color-system XYZ value, an RGB value, or the like. The L*a*b* value is an example of an attribute with respect to a color stimulus of the present invention, the RGB value is an example of an attribute with respect to the computer color of the present invention, and the color name, a color number, the XYZ value, and the HVC value are examples of an attribute with respect to the color of the present invention.

The color information generation device is provided with an input unit 41 that inputs a value of the displayed attribute information, a display data generation unit 40 that refers to the color database 12 to generate display data corresponding to the value of the attribute information input from the an input unit 41, and a display unit 42 that displays the display data generated by the display data generation unit 40. The color information generation device is provided with a color difference calculation unit 44 that calculates a color difference between two colors displayed on the display unit 42 and an attribute calculation unit 43, which converts the value of the attribute information input to the input unit 41 into a value of another type of attribute information and records the values of the pieces of attribute information in a color database 12 while correlating the values with each other.

Figure 2:
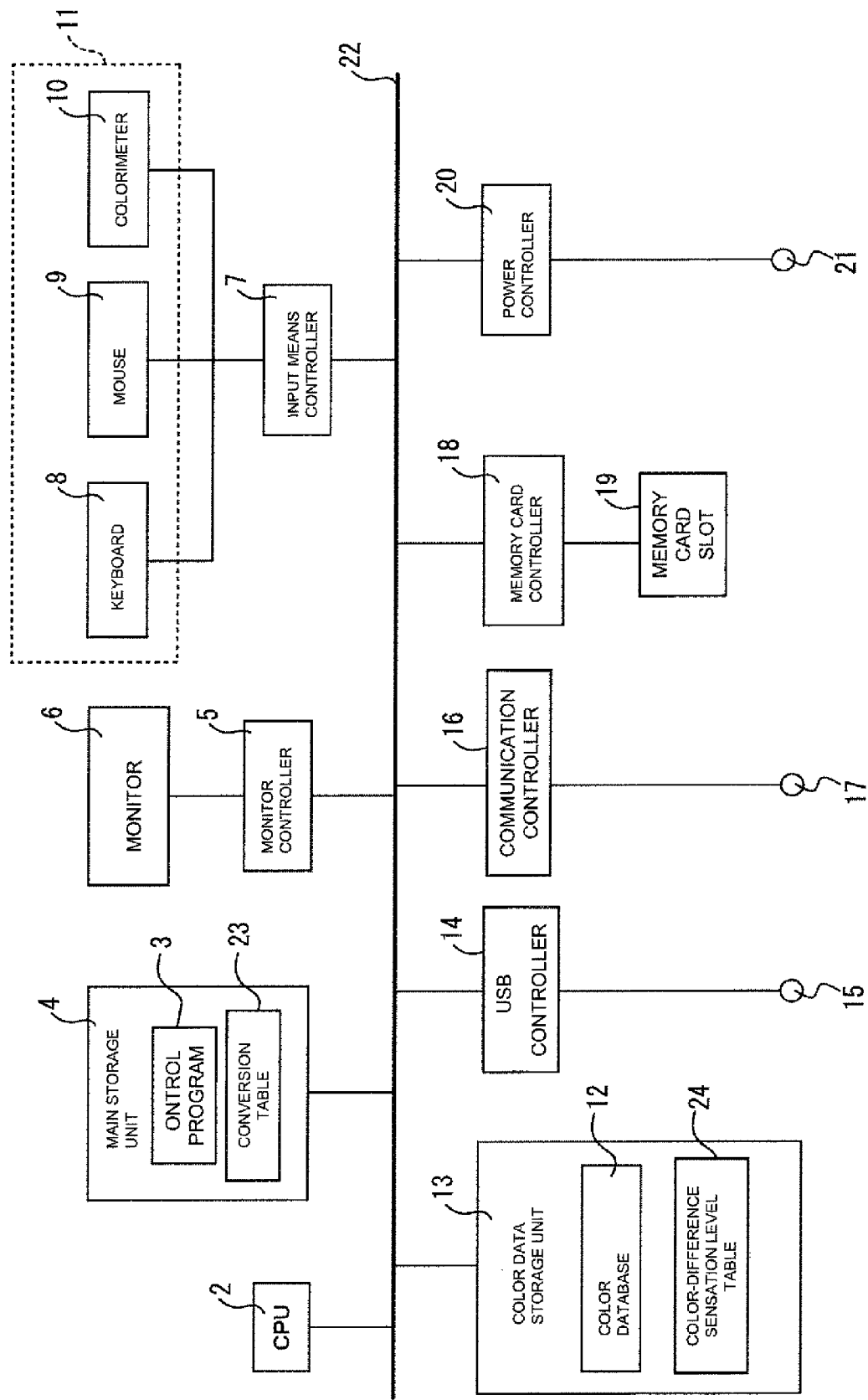
FIG. 2 is a block diagram illustrating a specific example of a device configuration of the color information generation device according to the embodiment of the present invention.

FIG. 2 is a block diagram illustrating a specific configuration example of the color information generation device of the embodiment.

A color information generation device 1 shown in FIG. 2 is provided with a CPU 2 that controls the whole device, a main storage unit 4 in which a control program 3 controlling the whole device is stored, a monitor 6 that is controlled by a monitor controller 5 to display the attribute information with respect to the color, input means 11, which includes a keyboard 8, a mouse 9, and a colorimeter 10 that are controlled by an input-means controller 7, a color data storage unit 13 in which the color database 12 is stored, a USB terminal 15 that is controlled by a USB controller 14, a communication line terminal 17 that is controlled by a communication controller 16, a memory card slot 19 that is controlled by a memory card controller 18, and a power switch 21 that is controlled by a power controller 20 to control supply of an electric power to the color information generation device 1. These units are connected to a bus 22.

A configuration in which the input-means controller 7 and input means 11 shown in FIG. 2 are combined corresponds to the input unit 41 shown in FIG. 1, and a configuration in which the monitor controller 5 and monitor 6 shown in FIG. 2 are combined corresponds to the display unit 42 in FIG. 1. The CPU 2 in FIG. 2 executes the control program 3 to realize functions of the display data generation unit 40, attribute calculation unit 43, and color difference calculation unit 44 in FIG. 1.

A conversion table 23 is stored in the main storage unit 4, and used to convert the L*a*b* value, the HVC value, the XYZ value, and the RGB value into one another. A color-difference sensation level table 24 is stored in the color data storage unit 13, and retains data that is a basis when a person sensuously recognizes the color difference. Memory cards, such as a memory stick, an SD card, and a compact flash (registered trademark), are inserted in the memory card slot 19. A USE cable is connected to the USE terminal 15, and a LAN cable or a telephone line is connected to the communication line terminal 17.

Figure 3A:
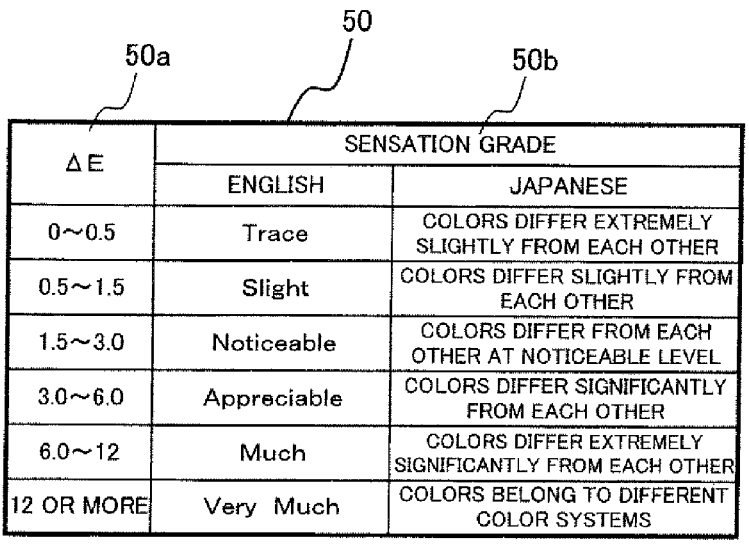
FIG. 3(a) is a configuration diagram of a conventional color-difference sensation level table.
Figure 3B:
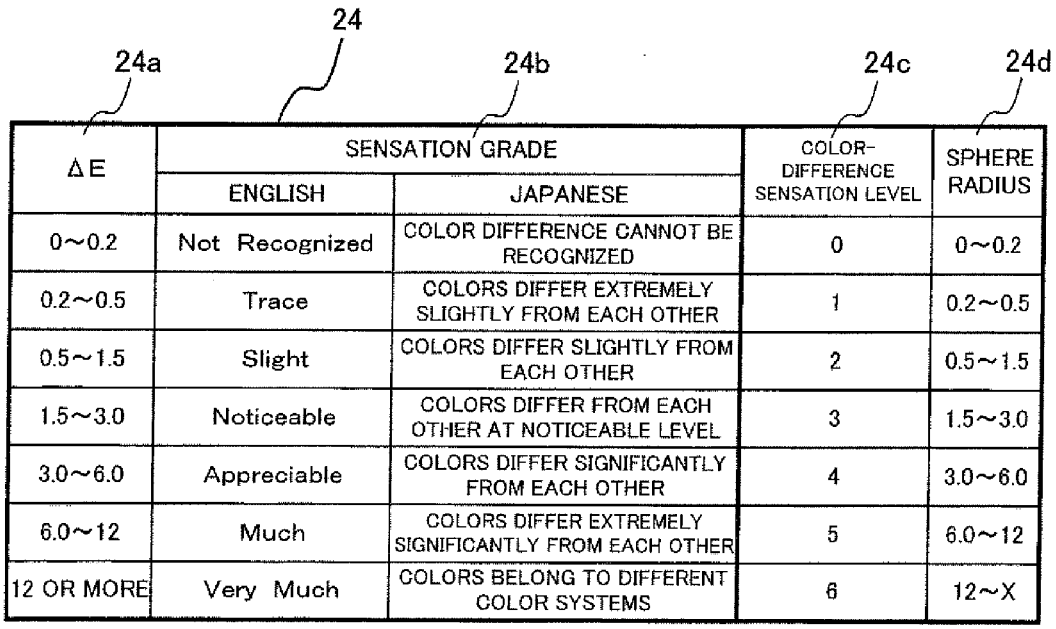
FIG. 3(b) is a configuration diagram of a color-difference sensation level table of the embodiment of the present invention.

FIG. 3(a) illustrates a configuration of a conventional color-difference sensation level table 50, and FIG. 3(b) illustrates a configuration of the color-difference sensation level table 24 of the embodiment.

The conventional color-difference sensation level table 50 in FIG. 3(a) retains a ΔE range item 50a in which a level at which the person can sensuously distinguish between colors is indicated by a range of a color difference ΔE in an L*a*b* color system and a sensation grade item 50b in which a level at which the person can sensuously distinguish between colors is indicated by a grade. Here, ΔE is the color difference in the L*a*b* color system. The sensation grade item 50b retains English and Japanese. The color-difference sensation level table 50 retains a value retained in the ΔE range item 50a and a value retained in the sensation grade item 50b while correlating the values with each other. Here, ΔE of "0 to 0.5" is correlated with a sensation grade "Trace, colors differ extremely slightly from each other". ΔE of "0.5 to 1.5" is correlated with a sensation grade "Slight, colors differs slightly from each other".

However, it is well known that the person can sensuously recognize the color difference even in the case of ΔE of "0 to 0.5". Therefore, the color data storage unit 13 of the embodiment retains not the conventional color-difference sensation level table 50 shown in FIG. 3(a) but the color-difference sensation level table 24 shown in FIG. 3(b).

In addition to a ΔE range item 24a and sensation grade item 24b, which correspond to the ΔE range item 50a and sensation grade item 50b of the conventional color-difference sensation level table 50, the color-difference sensation level table 24 in FIG. 3(b) retains a color-difference sensation level item 24c indicating a level of the color difference ΔE between two colors in the L*a*b* color system and a sphere-radius item 24d indicating a sphere radius of a color sphere in an L*a*b*-color-system color solid. The L*a*b*-color-system color solid is a uniform color space where a distance on a color space is designed to be proportional to a color sensation difference. Therefore, the sphere radius is proportional to the color difference.

The color-difference sensation level table 24 retains the values retained in the ΔE range item 24a, sensation grade item 24b, color-difference sensation level item 24c, and sphere-radius item 24d while correlating the values with one another.

Here, the color-difference sensation level item 24c retains seven levels of 0 to 6. Unlike the color-difference sensation level table 50 shown in FIG. 3(a), ΔE of "0 to 0.2" is stored in the color-difference sensation level table 24 shown in FIG. 3(b) while correlated with a sensation grade "Not Recognized, the color difference cannot be recognized", the color-difference sensation level of "0", and the sphere radius of "0 to 0.2". ΔE of "0.2 to 0.5" is stored while correlated with the sensation grade "Trace, colors differ extremely slightly from each other", the color-difference sensation level of "1", and the sphere radius of "0.2 to 0.5". Therefore, even if ΔE ranges "from 0 to 0.5", the color information generation device 1 can acquire the sensation grade, the color-difference sensation level, and the sphere radius depending on ΔE of "0 to 0.2" or "0.2 to 0.5". Therefore, a user can finely understand a characteristic color while strictly managing the color than the conventional case.

By the way, in this case, the sensation grade item 24b is retained in English and Japanese. Alternatively, the sensation grade item 24b may be retained in another language corresponding to each ΔE.

FIG. 4 illustrates a configuration of the color database 12.

A color number item 12a retaining a unique color number, a color name item 12b retaining a color name, an L*a*b*-value item 12c retaining the L*a*b* value, an HVC-value item 12d retaining the HVC value, an XYZ-value item 12e retaining the XYZ value, an RGB-value item 12f retaining the RGB value, and a sphere-radius item 12g indicating the sphere radius of the color sphere in the L*a*b*-color-system color solid are stored in the color database 12 while correlated with one another. The L*a*b*-value item 12c retains an L* value, an a* value, and a b* value, the HVC-value item 12d retains an H value, a V value, and a C value, the XYZ-value item 12e retains an X value, a Y value, and a Z value, and the RGB-value item 12f retains an R value, a G value, and a B value. At this point, it is assumed that the sphere-radius item 12g retains the sphere radius of "0.2". For example, the sphere radius retained in the sphere-radius item 12g is configured such that a value can be changed by inputting a numerical value through the keyboard 8 that is of the input unit 41.

For example, when the user inputs the color name using the keyboard 8 that is of the input unit 41, or when the user inputs the L* value, the a* value, and the b* value using the colorimeter 10, the attribute calculation unit 43 converts the color name or the L* value, the a* value, and the b* value into other pieces of attribute information corresponding to the input values. That is, for the configuration in FIG. 2, the CPU 2 converts the input L* value, a* value, and b* value into the H value, V value, and C value, the X value, Y value, and Z value, and the R value, G value, and B value, respectively, by a well-known technique using the conversion table 23. Then the CPU 2 retains the color name, the L* value, a* value, and b* value, the H value, V value, and C value, the X value, Y value, and Z value, and the R value, G value, and B value in the color name item 12b, the L*a*b*-value item 12c, the HVC-value item 12d, the XYZ-value item 12e, and the RGB-value item 12f, respectively, while correlating the color name, the L* value, a* value, and b* value, the H value, V value, and C value, the X value, Y value, and Z value, and the R value, G value, and B value with the color number retained in the color number item 12a.

Therefore, the attribute calculation unit 43 generates the color database 12, and the user can easily manage the color number, the color name, the L*a*b* value, the HVC value, the XYZ value, the RGB value, and the sphere radius while correlating easily the color number, the color name, the L*a*b* value, the HVC value, the XYZ value, the RGB value, and the sphere radius with one another.

Figure 5:
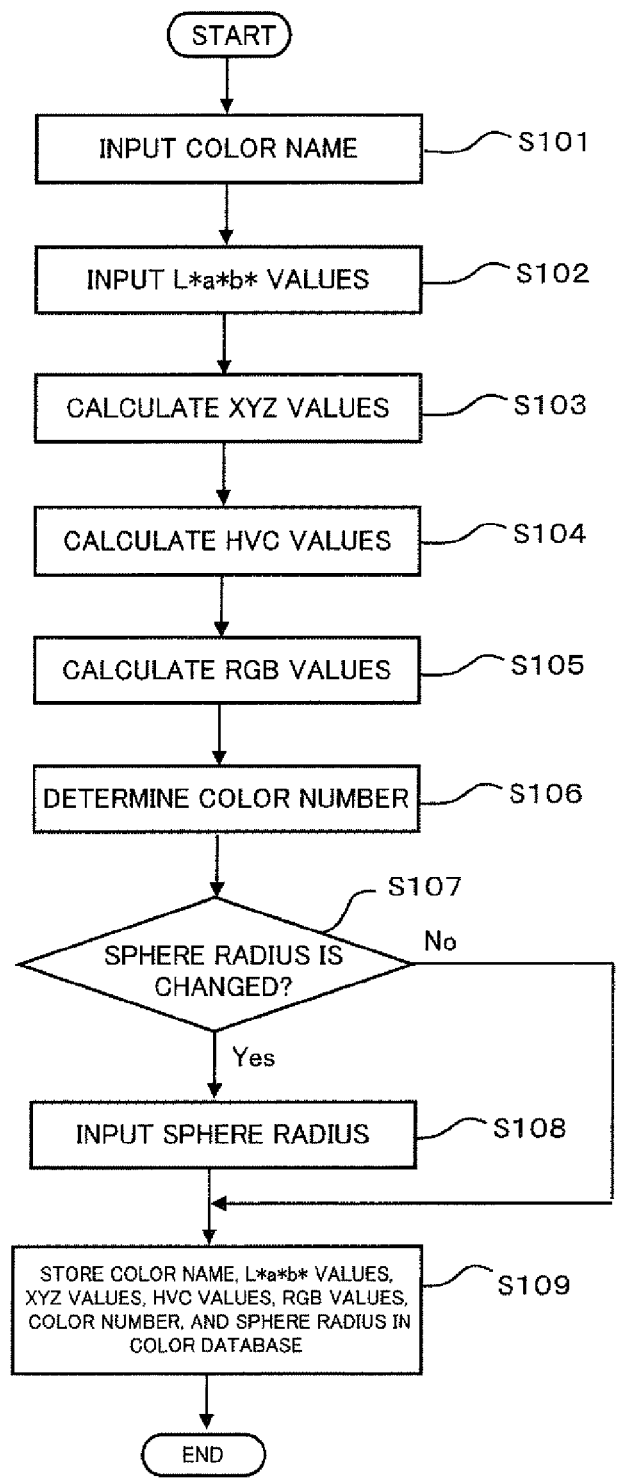
FIG. 5 is a flowchart of recording processing of recording attribute information in the color database according to of the embodiment of the present invention.

A procedure in which the attribute calculation unit 43 of the color information generation device of the embodiment records the attribute information in the color database 12 will be described below. FIG. 5 illustrates a flow of recording processing of recording the attribute information in the color database 12.

For example, the user inputs the color name through the keyboard 8 (S101) Then, for example, the L*a*b* value is input through the keyboard 8 or the colorimeter 10 (S102). When the L*a*b* value is input, the CPU 2 calculates the XYZ value from the input L*a*b* value using the conversion table 23 (S103), calculates the HVC value (S104), and calculates the RGB value (S105). The CPU 2 determines the unique color number that is not correlated with the color name or the L*a*b* value (S106).

Then the CPU 2 causes the monitor 6 to display a message whether the sphere radius retained in the sphere-radius item 12g is changed (S107). When the sphere radius is changed (Yes in S107), for example, the CPU 2 sets the numerical value input to the keyboard 8 to the sphere radius (S108).

On the other hand, when the sphere radius is not changed in Step S107 (No in S107), the CPU 2 sets a predetermined value to the sphere radius. At this point, for example, the predetermined value is 0.2.

The CPU 2 retains the color number in the color number item 12a, the color name in the color name item 12b, the L*a*b* value in the L*a*b*-value item 12c, the HVC value in the HVC-value item 12d, the XYZ value in the XYZ-value item 12e, the RGB value in the RGB-value item 12f, and the sphere radius in the sphere-radius item 12g(S109). Then the recording processing is ended.

Thus, the attribute calculation unit 43 calculates the HVC value, the XYZ value, and the RGB value based on the L*a*b* value. At this point, the attribute calculation unit 43 is configured to be able to calculate the L*a*b* value, the HVC value, the XYZ value, or the RGB value even if any one of the HVC value, the XYZ value, and the RGB value is input.

As described above, for example, the user inputs the color name and the L*a*b* value to the input unit 41 to be able to easily produce the color database 12 in which the color number, the color name, the L*a*b* value, the HVC value, the XYZ value, the RGB value, and the sphere radius are correlated with one another.

The color sphere in the L*a*b*-color-system color solid will be described below.

Figure 6:
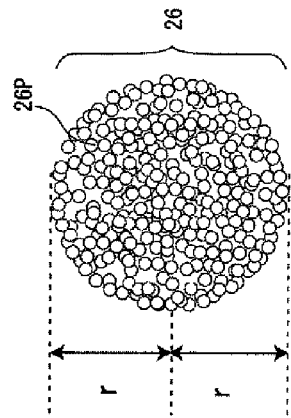
FIG. 6(a) is a view illustrating a state of a color sphere in an L*a*b*-color-system color solid according to the embodiment of the present invention.
FIG. 6(b) is a view illustrating a configuration of the color sphere in the L*a*b*-color-system color solid according to the embodiment of the present invention.
Figure 6:
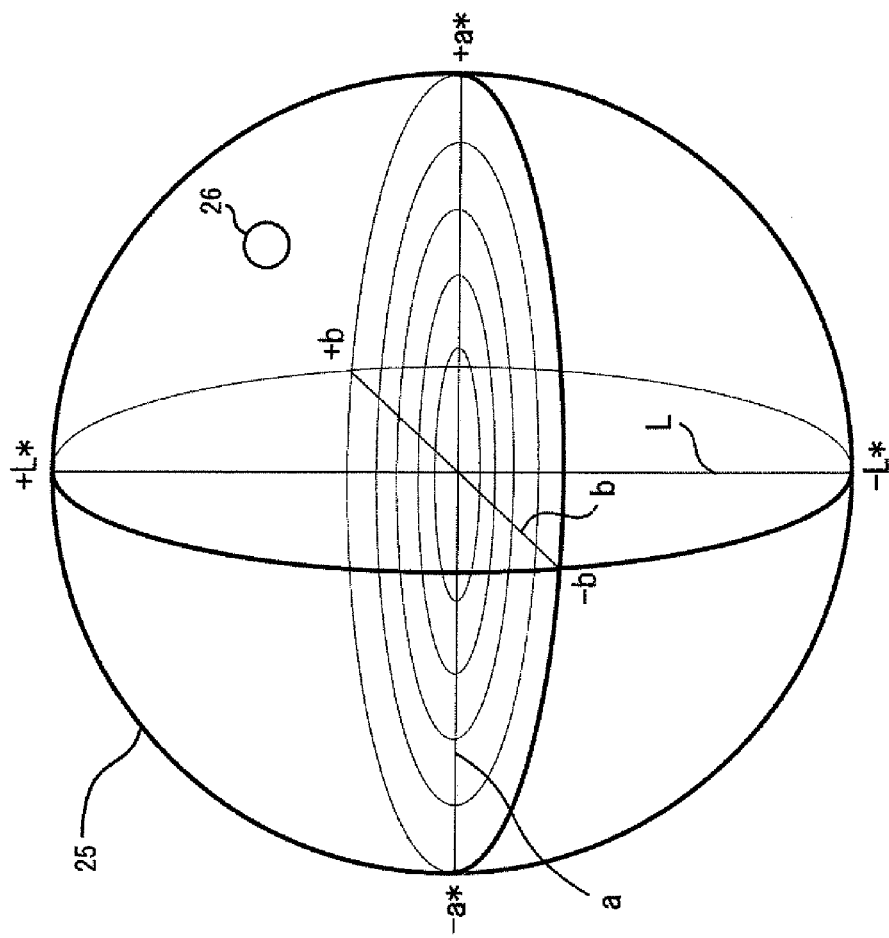

FIGS. 6(a) and 6(b) illustrate a state and a configuration of a color sphere 26. FIG. 6(a) illustrates the state of the color sphere 26 in an L*a*b*-color-system color solid 25, and FIG. 6(b) illustrates the configuration of the color sphere 26.

Referring to FIG. 6(a), the L*a*b*-color-system color solid 25 is a spherical solid in which an axis a connecting +a in a red direction and −a in a green direction, an axis b connecting +b in a yellow direction and −b in a blue direction, and an axis L connecting +L in a white direction and −L in a black direction are orthogonal to one another. The color sphere 26 is formed into a substantially spherical shape in the L*a*b*-color-system color solid 25.

Referring to FIG. 6(b), the color sphere 26 is the substantially spherical shape having a sphere radius r, and is constructed by a cluster of many L*a*b* values 26P. Referring to FIG. 4, the sphere radius r is the value retained in the sphere-radius item 12g of the color database 12. At this point, for example, the sphere radius r is 0.2.

Referring to the color-difference sensation level table 24 in FIG. 3(b), the color sphere 26 having the sphere radius r of 0.2 means the cluster of the L*a*b* values 26P in which the person cannot recognize the color difference because of the sensation grade "Not Recognized, color difference cannot be recognized" correlated with the sphere-radius item 24d of "0 to 0.2". This means that the person recognizes all the L*a*b* values 26P existing in the color sphere 26 as the same color. Thus, the color information generation device of the embodiment can indicate the range of the color corresponding to a predetermined condition by displaying the color sphere 26 corresponding to the value of the sphere radius r in the L*a*b*-color-system color solid 25.

At this point, the monitor 6 that is of the display unit 42 displays the color sphere 26 in the color based on the RGB value corresponding to the L*a*b* value 26P. Therefore, the user visually recognizes the color sphere 26 displayed on the monitor 6, which allows the user to understand not only the color range but also the color indicated by the color sphere 26. Additionally the user considers a position of the color sphere 26 in the L*a*b*-color-system color solid 25, for example, which allows the user to learn how much the color sphere 26 is biased toward the red direction.

A procedure in which the display data generation unit 40 forms the color sphere 26 will be described below.

FIGS. 7(a) to 7(d) illustrate the procedure to form the color sphere 26 in the L*a*b*-color-system color solid 25.

Figure 7:
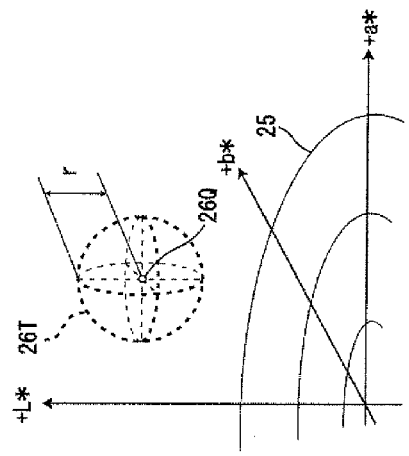
FIGS. 7(a) to 7(d) are views illustrating a procedure in which a display data generation unit according to the embodiment of the present invention forms the color sphere in the L*a*b*-color-system color solid.
Figure 7:
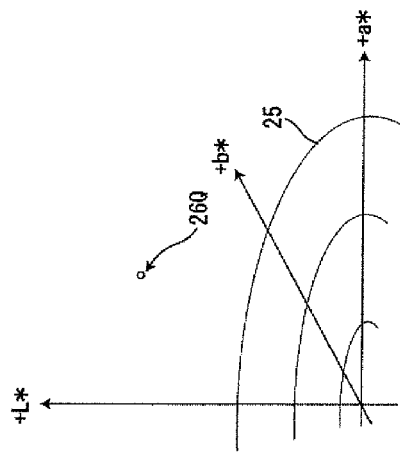
Figure 7:
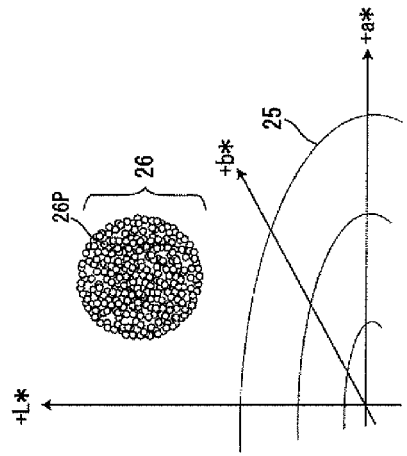
Figure 7:
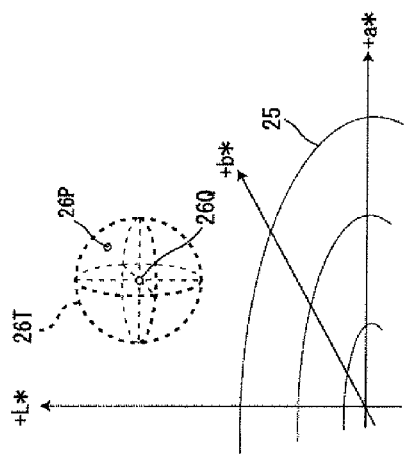

In FIG. 7(a), the CPU 2 plots L*a*b* value 26Q, which becomes a center of the color sphere 26, in the L*a*b*-color-system color solid 25. The L*a*b* value 26Q is determined by assigning the color number, color name, or L*a*b* value, which is retained in the color database 12, through the keyboard 8 or the mouse 9.

Then, in FIG. 7(b) the CPU 2 refers to the color database 12 to acquire the sphere radius r correlated with the determined L*a*b* value 26Q from the sphere-radius item 12g, and the CPU 2 forms a tentative color sphere 26T having the sphere radius r with the L*a*b* value 26Q plotted in the L*a*b*-color-system color solid 25 as the center.

Sometimes the L*a*b* value exists out of a display range of the RGB value. In FIG. 7(c), the CPU 2 acquires plural RGB values existing in a predetermined range by referring to the predetermined range of the RGB value stored in the main storage unit 4.

The CPU 2 converts the L*a*b* value into the XYZ value, and converts the XYZ value into the RGB value. A well-known conversion equation is used.

Therefore, the monitor 6 can display the acquired L*a*b* value based on the RGB value. Then the CPU 2 determines whether the converted L*a*b* value exists in the tentative color sphere 26T, and the CPU 2 plots only the L*a*b* value existing in the tentative color sphere 26T in the L*a*b*-color-system color solid 25.

In FIG. 7(d), the CPU 2 plots all the converted L*a*b* value existing in the tentative color sphere 26T in the L*a*b*-color-system color solid 25, thereby forming the color sphere 26.

Thus, the display data generation unit 40 generates the display data in which the color sphere 26 is disposed in the line-drawing L*a*b*-color-system color solid 25. Using the display data generated by the display data generation unit 40, the color sphere 26 colored based on the RGB value is displayed on the monitor 6 that is of the display unit 42.

Figure 8:
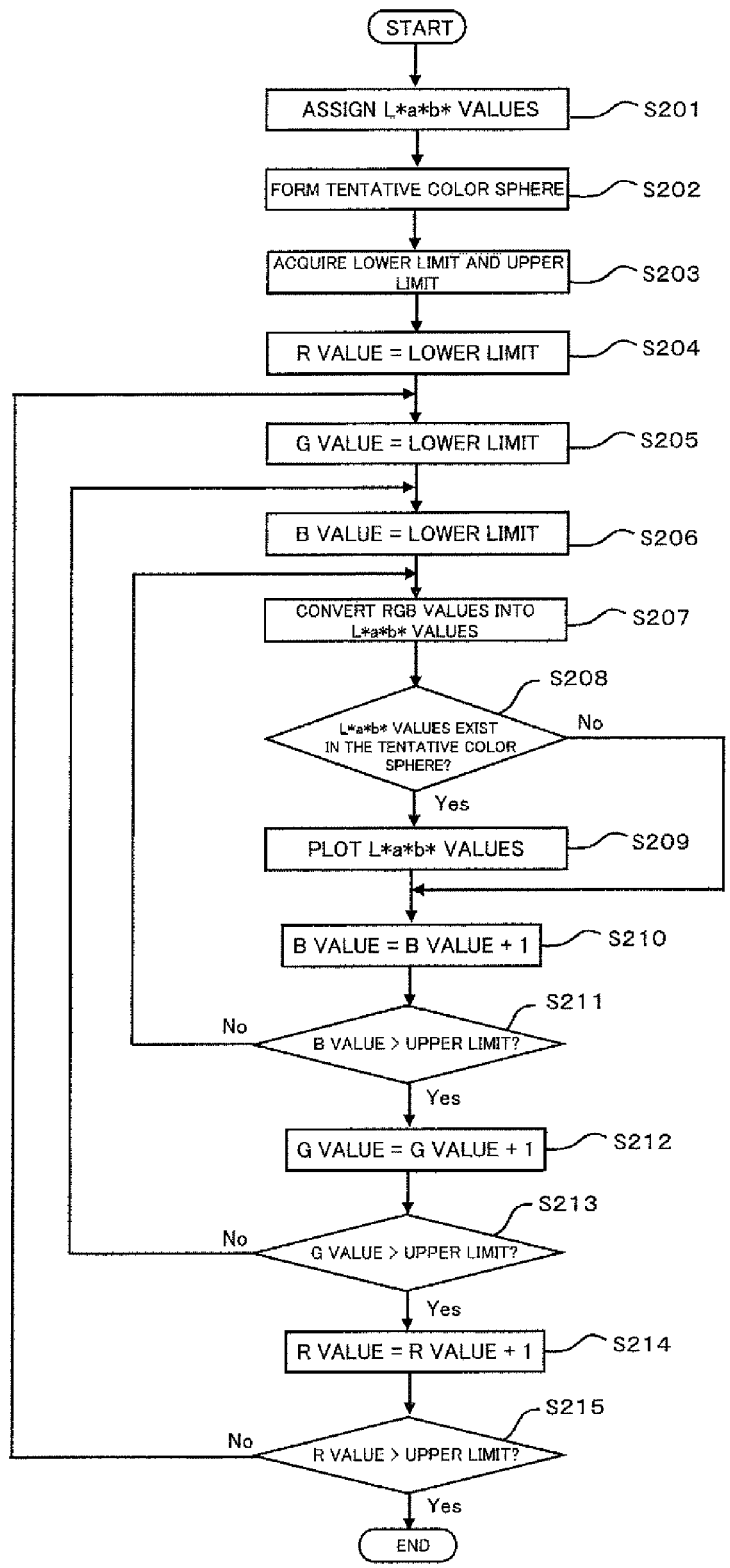
FIG. 8 is a flowchart of color sphere forming processing in which the display data generation unit according to the embodiment of the present invention forms the color sphere.

FIG. 8 illustrates a flow of color sphere forming processing in which the display data generation unit 40 forms the color sphere 26.

Referring to FIG. 8, for example, when the L*a*b* value 26Q that becomes the center of the color sphere 26 is assigned through the keyboard 8 or the mouse 9 (S201), the CPU 2 forms the tentative color sphere 26T having the sphere radius r with the L*a*b* value 26Q as the center in the L*a*b*-color-system color solid 25 (S202). At this point, a lower limit and an upper limit are stored in the main storage unit 4 with respect to each of the R value, G value, and B value of the RGB value. The CPU 2 acquires the lower limit and upper limit from the main storage unit 4 with respect to each of the R value, G value, and B value of the RGB value (S203). The CPU 2 sets the lower limit of the R value to the R value (S204), sets the lower limit of the G value to the G value (S205), and sets the lower limit of the B value to the B value (S206). The CPU 2 converts the RGB value including the R value, the G value, and the B value into the L*a*b* value (S207).

Then the CPU 2 determines whether the converted L*a*b* value exist in the tentative color sphere 26T (S208). When the L*a*b* values exist in the tentative color sphere 26T (Yes in S208), the CPU 2 sets the L*a*b* value to the L*a*b* value 26P to plot the L*a*b* value 26P in the tentative color sphere 26T (S209), and the CPU 2 performs processing in Step S210.

On the other hand, when the L*a*b* value does not exist in the tentative color sphere 26T in Step S208 (No in S208), the CPU 2 performs the processing in Step S210 without plotting the L*a*b* value 26P in the tentative color sphere 26T.

In Step S210, the CPU 2 increments the B value by 1. The CPU 2 determines whether the B value is greater than the upper limit of the B value (S211). When the B value is less than or equal to the upper limit of the B value (No in S211), the CPU 2 performs the pieces of processing in Steps S207 to S211. On the other hand, when the B value is greater than the upper limit of the B value in Step S211 (Yes in S211), the CPU 2 increments the G value by 1 (S212). The CPU 2 determines whether the G value is greater than the upper limit of the G value in Step S213 (S213). When the G value is less than or equal to the upper limit of the G value (No in S213), the CPU 2 performs the pieces of processing in Steps S206 to S213. On the other hand, when the G value is greater than the upper limit of the G value (Yes in S213), the CPU 2 increments the R value by 1 (S214). The CPU 2 determines whether the R value is greater than the upper limit of the R value (S215).

When the R value is less than or equal to the upper limit of the R value (No in S215), the CPU 2 performs the pieces of processing in Steps S205 to S215. On the other hand, when the R value is greater than the upper limit of the R value in Step S215 (Yes in S215), the CPU 2 ends the color sphere forming processing.

In Steps S210, S212, and S214, the increment values of the B value, G value, and R value may be not 1, but 0.5 or 2.

Thus, the display data generation unit 40 of the embodiment converts the plural RGB values included in the range from the lower limit to upper limit, which are stored in the main storage unit 4 into the L*a*b* values, thereby generating the display data in which the color sphere 26 is formed in the L*a*b*-color-system color solid 25.

The L*a*b* value 26Q that becomes the center of the displayed color sphere 26 is input in Step S201. Alternatively, other pieces of attribute information, such as the color name, the HVC value, the XYZ value, and the RGB value, are input instead of the L*a*b* values, and the input pieces of attribute information may be converted into the L*a*b* values by referring to the color database 12. The processing of inputting the attribute information in Step S201 corresponds to an example of the input step of the present invention. The processing of generating the display data displayed on the monitor 6 in Steps S202 to S215 correspond to an example of the display data generating step of the present invention.

In the embodiment, all the L*a*b* values 26P located in the tentative color sphere 26T are extracted and plotted to form the display data. Alternatively, as illustrated in FIG. 6(a), the L*a*b* values 26P existing in a surface portion of the tentative color sphere 26T may be disposed in order to display the color sphere 26 on the monitor 6, and only the L*a*b* values 26P existing in the surface portion of the tentative color sphere 26T may be plotted to generate the display data. When at least the L*a*b* values 26P existing in a surface portion of the tentative color sphere 26T are plotted, the color sphere 26 can be displayed on the monitor 6 even if the L*a*b*-color-system color solid 25 displayed on the monitor 6 is vertically and horizontally rotated.

However, in the case that the color sphere 26 displayed on the monitor 6 can be zoomed such that the inside of the color sphere 26 is displayed, as described above, it is necessary the L*a*b* value 26P located in the tentative color sphere 26T be plotted to generate the display data.

When the color sphere 26 displayed on the monitor 6 is zoomed, a distance between the displayed colors increases, and a color distribution in the surface or internal section of the color sphere 26, which cannot visually be recognized before the zoom, can visually be recognized.

The color sphere in the Munsell-color-system color solid will be described below.

Figure 9:
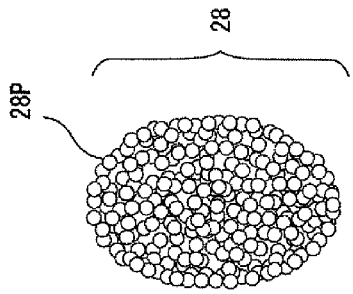
FIG. 9(a) is a view illustrating a state of a color oval sphere in a Munsell-color-system color solid according to the embodiment of the present invention.
FIG. 9(b) is a view illustrating a configuration of the color oval sphere in the Munsell-color-system color solid according to the embodiment of the present invention
FIG. 9(c) is a view illustrating a center point of the color oval sphere in the Munsell-color-system color solid according to the embodiment of the present invention.
Figure 9:
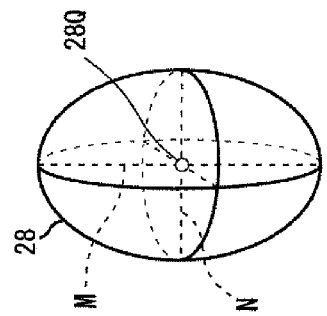
Figure 9:
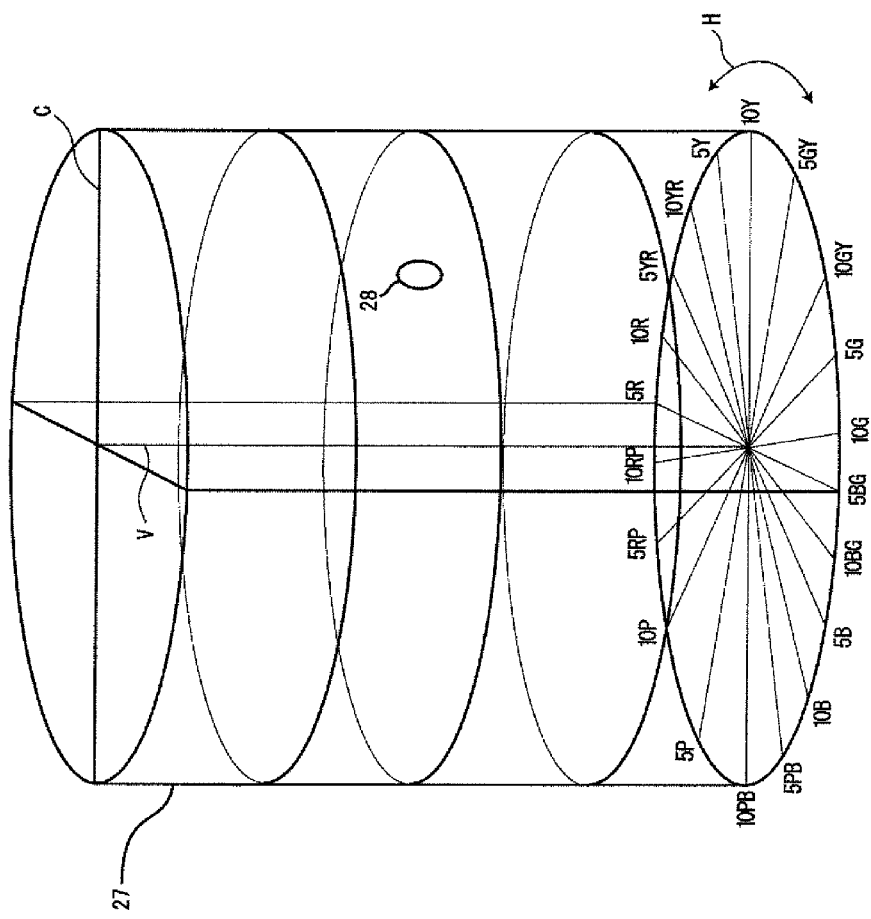

FIGS. 9(a) and 9(b) illustrate a state and a configuration of a color oval sphere 28 in a Munsell-color-system color solid 27. FIG. 9(a) illustrates the state of the color oval sphere 28 in the Munsell-color-system color solid 27, and FIG. 9(b) illustrates the configuration of the color oval sphere 28. FIG. 9(c) illustrates a center point 28Q in the color oval sphere 28.

Referring to FIG. 9(a), the Munsell-color-system color solid 27 is a columnar solid that includes an axis V indicating lightness in a vertical direction, an axis C indicating chroma in a direction perpendicular to the axis V, and a circumferential direction H indicating a hue in a circumferential direction of a circle with the axis V as the center. The color oval sphere 28 is formed into a substantially oval sphere shape in the Munsell-color-system color solid 27. However, it is noted that, depending on a position of a three-dimensional coordinate of the Munsell-color-system color solid, the color oval sphere 28 becomes not a symmetrical oval shape but a considerably-deformed oval shape.

Referring to FIG. 9(b), the color oval sphere 28 is constructed by a cluster of many HVC values 28P, and is formed into the substantially oval sphere. At this point, referring to FIG. 6(b), the HVC value 28P is one in which the L*a*b* value 26P constituting the color sphere 26 is converted into the HVC value 28P. Accordingly, the color oval sphere 28 is one in which the color sphere 26 in the L*a*b*-color-system color solid 25 is converted into the color sphere 26 in the Munsell-color-system color solid 27. When the color sphere 26 in the L*a*b*-color-system color solid 25 is converted into the colored oval sphere 28 in the Munsell-color-system color solid 27, the color oval sphere 28 becomes a substantially oval sphere shape.

Referring to FIG. 9(c), because the center point 28Q is deformed when the color solid is converted, the center point 28Q is not necessarily the center point of the color oval sphere 28.

Thus, the display data generation unit 40 generates the display data in which the color oval sphere 28 is disposed in the line-drawing Munsell-color-system color solid 27. Using the display data generated by the display data generation unit 40, the monitor 6 that is of the display unit 42 displays the color oval sphere 28 in the color based on the RGB value corresponding to the HVC value 28P.

Therefore, the user visually recognizes the color oval sphere 28 displayed on the monitor 6, which allows the user to understand not only the color range but also the color indicated by the color oval sphere 28. Additionally the user considers the position of the color oval sphere 28 in the Munsell-color-system color solid 27, for example, which allows the user to learn how much the color oval sphere 28 is biased toward the lightness direction.

Figure 10:
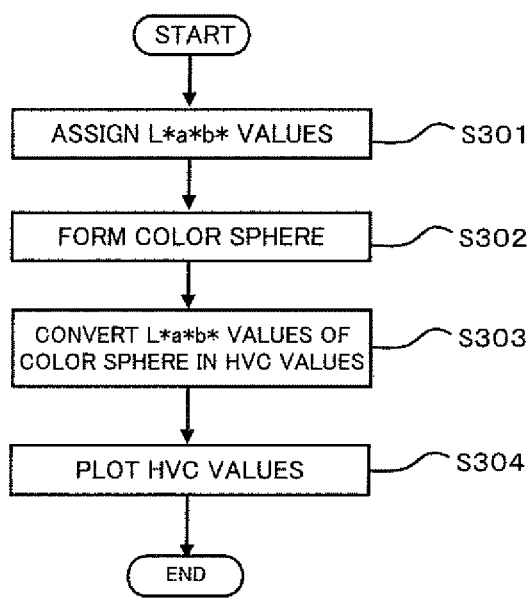
FIG. 10 is a flowchart of color oval sphere forming processing in which the display data generation unit according to the embodiment of the present invention forms the color oval sphere.

FIG. 10 illustrates a flow of color oval sphere forming processing in which the display data generation unit 40 forms the color oval sphere 28.

Referring to FIG. 10, for example, when the L*a*b* value 26Q that becomes the center of the color sphere 26 is assigned through the keyboard 8 or the mouse 9 (S301), the CPU 2 forms the color sphere 26 in the L*a*b*-color-system color solid 25 (S302). At this point, the CPU 2 forms the color sphere 26 by performing the pieces of processing in Steps S202 to S215 in FIG. 8.

The CPU 2 converts the many L*a*b* values 26P constituting the color sphere 26 into the HVC values 28P (S303).

Then the CPU 2 forms the color oval sphere 28 by plotting the converted HVC value 28P in the Munsell-color-system color solid 27 (S304). Then the color oval sphere forming processing is ended.

Conventionally, a space of the color name cannot sterically be expressed in the Munsell color system. On the other hand, in the color information generation device of the embodiment, a representative value is converted into the L*a*b* color system to use the color difference (the radius of the color sphere), and the space of the color name is sterically expressed in the Munsell color system.

In this case, the color sphere is displayed in the L*a*b*-color-system color solid and the color oval sphere is displayed in the Munsell-color-system color solid. However, in the color information generation device of the embodiment, the attribute of the color can be displayed in other color-system color solids except the L*a*b*-color-system color solid and the Munsell-color-system color solid in the same manner.

Therefore, the user can understand a spatial characteristic of the attribute of the color in various color-system color solids.

A color search screen displayed on the monitor 6 in searching the color will be described below.

Figure 11:
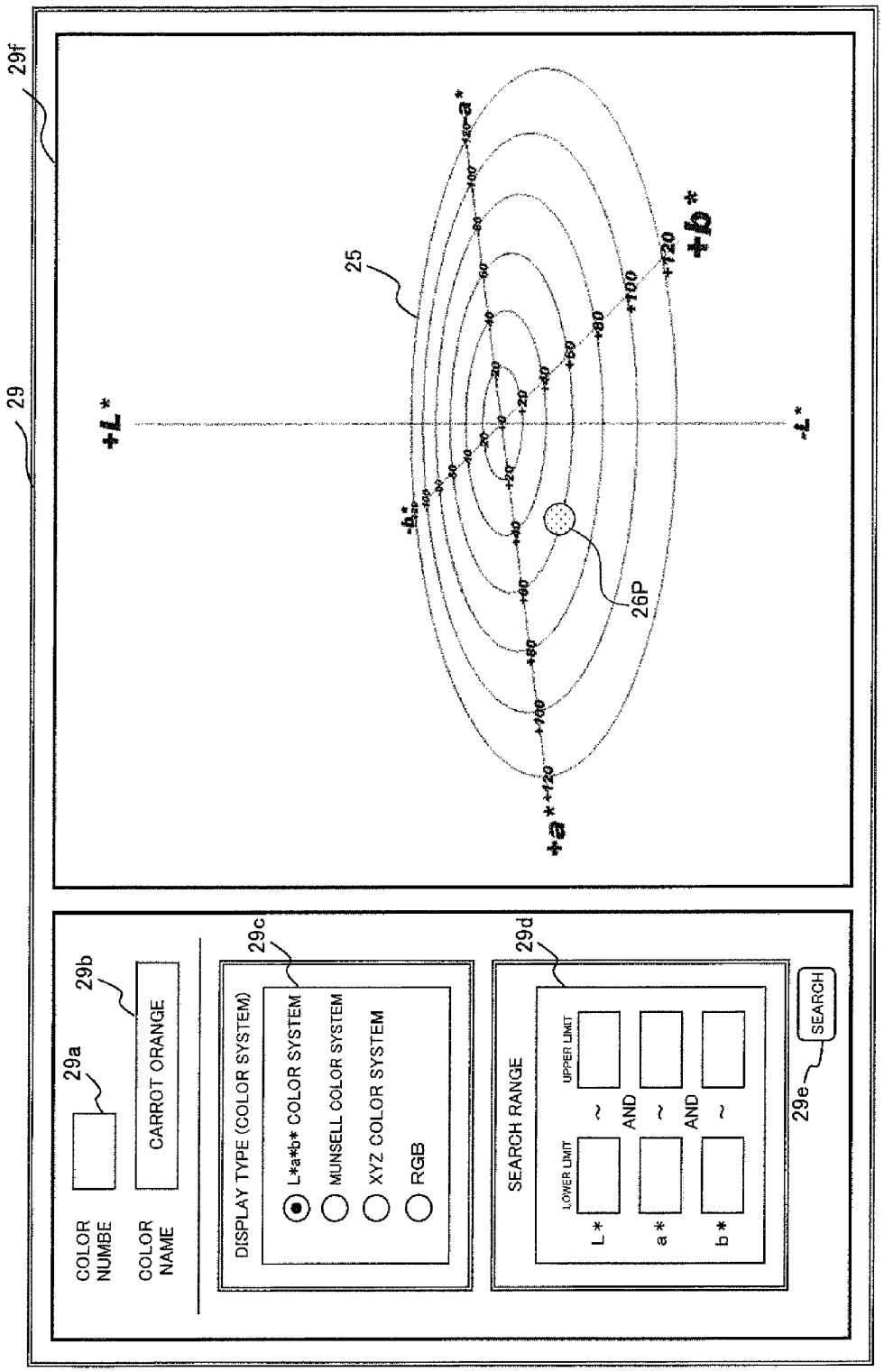
FIG. 11 is a view illustrating an example of a color search screen displayed on a monitor according to the embodiment of the present invention.

FIG. 11 illustrates an example of a color search screen 29 displayed on the monitor 6 that is of the display unit 42.

The color search screen 29 includes a color number input item 29a to which the color number is input, a color name input item 29b to which the color name is input, a display type item 29c that selects which one of display types of the L*a*b* color system, the Munsell color system, the XYZ color system, and RGB the searched color is displayed, and a search range item 29d that assigns the range of the L*a*b* value, HVC value, XYZ value, or RGB value as input items to which search conditions are input in order to search the color.

The color search screen 29 also includes a search button 29e that is pressed in performing the color search based on a content input to the color number input item 29a, the color name input item 29b, the display type item 29c, or the search range item 29d. The color search screen 29 also includes a result display window 29f in which a search result is displayed.

The user inputs the search conditions to all or part of the color number input item 29a, the color name input item 29b, the display type item 29c, and the search range item 29d, and presses the search button 29e to search the color.

In FIG. 11, as the search conditions, a color name "carrot orange" is input to the color name input item 29b, and the L*a*b* color system is selected in the display type item 29c. In the case that the user does not select the display type, the display type item 29c is configured such that the L*a*b* color system is selected as a default value. For example, the color name is input using the keyboard 8, and the display type item 29c is input using the mouse 9.

When the L*a*b* color system is selected in the display type item 29c, the search range item 29d displays an item to which the range of L*a*b* value is input.

In response to the press of the search button 29e, the display data generation unit 40 generates the display data displayed in the result display window 29f, and the search result is displayed in the result display window 29f based on the color name "carrot orange" and the L*a*b* color system selected in the display type item 29c as illustrated in FIG. 11.

The L*a*b*-color-system color solid 25 is displayed in the result display window 29f because the L*a*b* color system is selected in the display type item 29c. In the result display window 29f, the L*a*b* value of the searched color is displayed as the L*a*b* value 26P in the line-drawing L*a*b*-color-system color solid 25. At this point, in the result display window 29f, the L*a*b* value 26P is displayed in the color based on the RGB value corresponding to the L*a*b* value 26P. In FIG. 11, the coloring of the L*a*b* value 26P is expressed by texturing.

Figure 12:
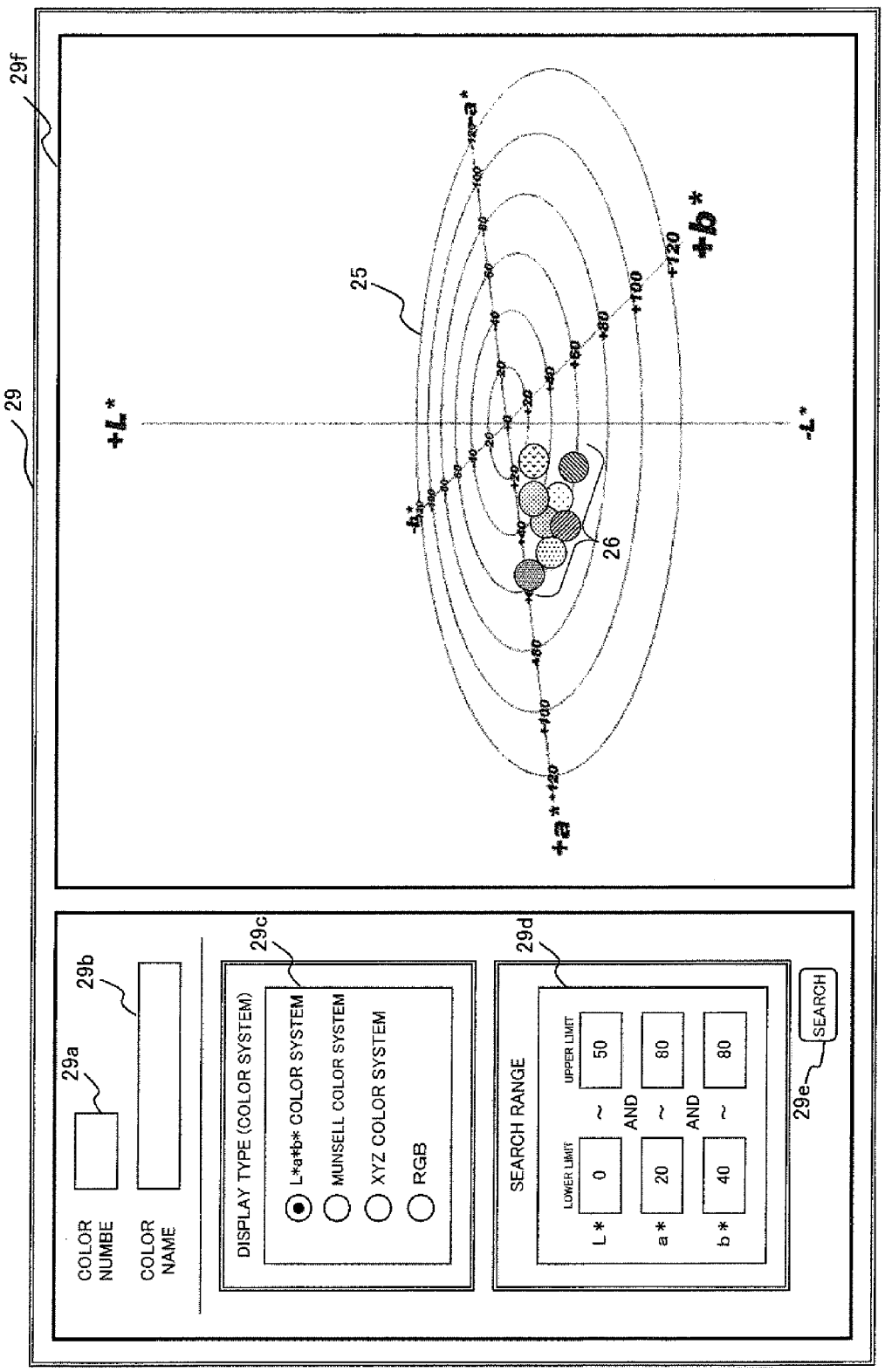
FIG. 12 is a view illustrating an example of the color search screen displayed on a monitor according to the embodiment of the present invention.

FIG. 12 illustrates another example of the color search screen 29 displayed on the monitor 6.

In FIG. 12, as the search conditions, the L*a*b* color system is selected in the display type item 29c, and the range of the L*a*b* value is input to the search range item 29d. In the search range item 29d, the L* value ranges from "0 to 50", the a* value ranges from "20 to 80", and the b* value ranges from "40 to 80".

In response to the press of the search button 29e, the display data generation unit 40 generates the display data displayed in the result display window 29f, and the search result is displayed in the result display window 29f based on the L*a*b* color system selected in the display type item 29c and the range of the L*a*b* value input to the search range item 29d as illustrated in FIG. 12.

The L*a*b*-color-system color solid 25 is displayed in the result display window 29f because the L*a*b* color system is selected in the display type item 29c. In the result display window 29f, the plural L*a*b* values corresponding to the range of the L*a*b* value input to the search range item 29d are also displayed as the L*a*b* values 26P in the L*a*b*-color-system color solid 25. At this point, in the result display window 29f, each of the L*a*b* values 26P is displayed in the color based on the RGB value corresponding to the L*a*b* value 26P. In FIG. 12, the color difference of each L*a*b* value 26P is expressed by the difference of the texturing.

Although the color name corresponding to each L*a*b* value 26P is not displayed in the result display window 29f in FIG. 12, a pop-up window of the color name corresponding to the desired L*a*b* values 26P is displayed when a cursor is pointed to the position of the L*a*b* values 26P displayed in the result display window 29f using the mouse 9.

Thus, the search result is displayed in the result display window 29f, so that the user can understand the search result by the L*a*b* color system, the Munsell color system, the XYZ color system, or the RGB by inputting search condition to the color number input item 29a, the color name input item 29b, the display type item 29c or the search range item 29d. The searched color is displayed by coloration and the color name corresponding to the searched color in the result display window 29f, the user can visually check the easily-searched color.

Figure 13:
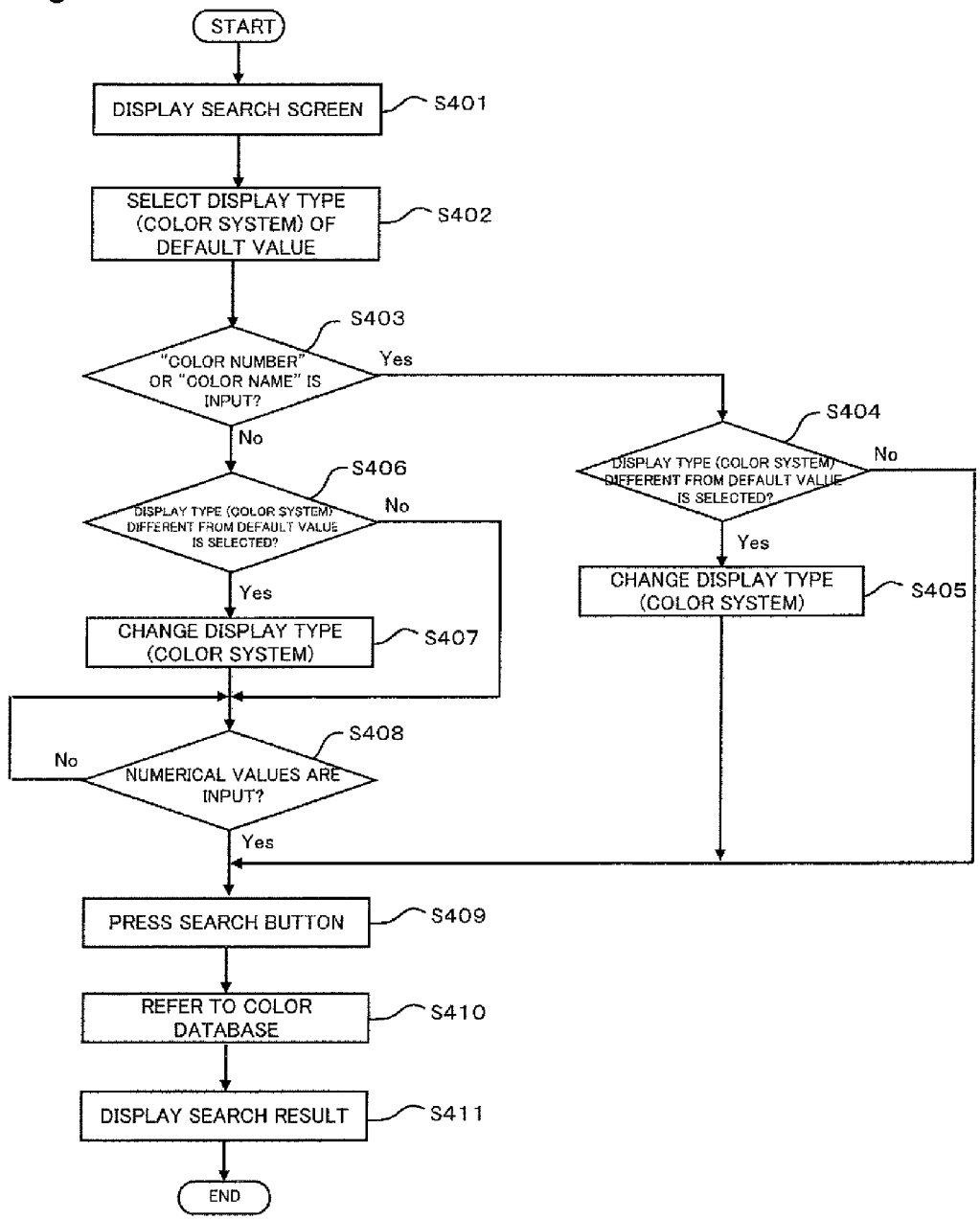
FIG. 13 is a flowchart of color searching processing in the display data generation unit when a color is searched in the color information generation device according to the embodiment of the present invention.

FIG. 13 is a flow of color searching processing in the display data generation unit 40 when the color is searched.

Referring to FIG. 13, the monitor 6 that is of the display unit 42 displays the color search screen 29 in FIGS. 11 and 12 (S401). In the display type item 29c of the color search screen 29, the L*a*b* color system is selected as the default value (S402).

When the color number or the color name is input to the color number input item 29a or the color name input item 29b (Yes in S403), the CPU 2 waits for the selection of the display type different from the L*a*b* color system that is of the default value in the display type item 29c (S404). As used herein, the display type different from the L*a*b* color system that is of the default value means the Munsell color system, the XYZ color system, or the RGB.

When the display type different from the L*a*b* color system is selected in Step S404 (Yes in S404), the CPU 2 changes the display type in the display type item 29c from the L*a*b* color system to the selected display type (S405). When the user presses the search button 29e (S409), the CPU 2 refers to the color database 12 (S410).

On the other hand, when the display type different from the L*a*b* color system is not selected in Step S404 (No in S404), and when the search button 29e is pressed (S409), the CPU 2 refers to the color database 12 (S410).

In Step S410, the CPU 2 detects the input color number or color name from the color number item 12a or color name item 12b of the color database 12. At this point, it is assumed that the L*a*b* color system is selected in the display type item 29c. In this case, the CPU 2 acquires the L*a*b* value, which is correlated with the color number or color name detected from the color number item 12a or color name item 12b of the color database 12, from the L*a*b*-value item 12c of the color database 12.

The CPU 2 generates the display data with the acquired L*a*b* value as the L*a*b* value 26P, and displays the display data in the result display window 29f (S411).

When the color number or the color name is not input to the color number input item 29a or the color name input item 29b in Step S403 (No in S403), the CPU 2 waits for the selection of the display type different from the L*a*b* color system that is of the default value in the display type item 29c (S406).

When the display type different from the L*a*b* color system is selected in Step S406 (Yes in S406), the CPU 2 changes the display type in the display type item 29c from the L*a*b* color system to the selected display type (S407), and performs processing in Step S408.

On the other hand, when the display type different from the L*a*b* color system is not selected in Step S406 (No in S406), the CPU 2 waits for the inputs of the numerical values defining the search range to the search range item 29d (S408).

When the numerical value is input to the search range item 29d in Step S408 (Yes in S408), and when the search button 29e is pressed (S409), the CPU 2 refers to the color database 12 (S410). At this point, it is assumed that the L*a*b* color system is selected in the display type item 29c. The CPU 2 acquires all the L*a*b* values corresponding to the numerical values input to the search range item 29d from the L*a*b*-value item 12c of the color database 12. The CPU 2 generates the display data with all the acquired L*a*b* values as the L*a*b* values 26P, and displays the display data in the result display window 29f (S411).

Thus, in the color information generation device of the embodiment, using the color search screen 29 displayed on the display unit 42 and the color database 12, the desired color of the user can be displayed in the result display window 29f by the desired display type of the user. Therefore, the user can learn the characteristic of the searched color while easily searching the color.

The case that the color difference calculation unit 44 of the color information generation device of the embodiment calculates the color difference ΔE between the two color spheres 26 in the L*a*b*-color-system color solid 25 will be described below.

Figure 14B:
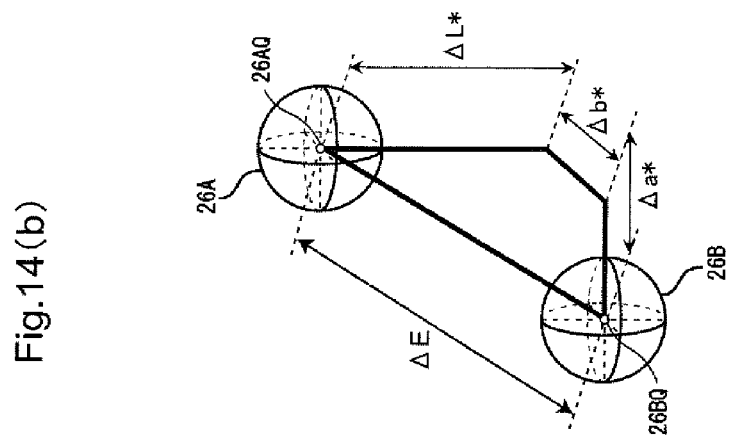
FIG. 14(b) is a view illustrating a color difference of the two color spheres in the L*a*b*-color-system color solid of the embodiment of the present invention.
Figure 14A:
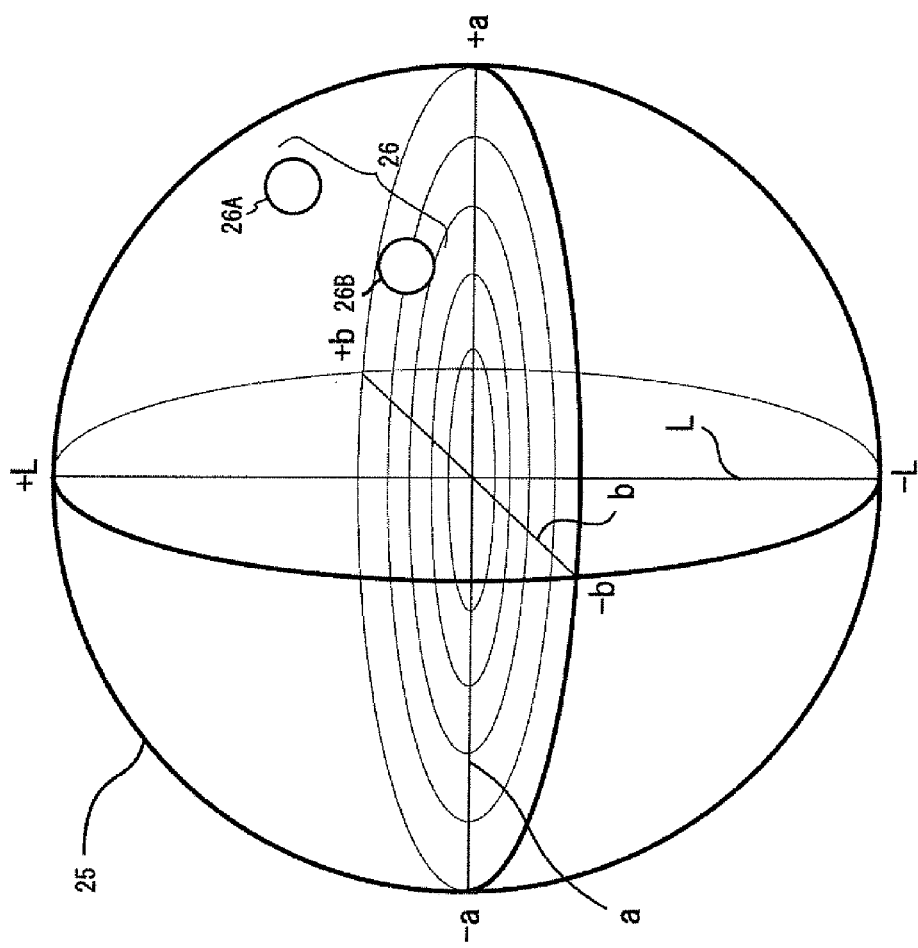
FIG. 14(a) is a view illustrating states of two color spheres in the L*a*b*-color-system color solid according to the embodiment of the present invention

FIGS. 14(a) and 14(b) illustrate states of the two color spheres 26. FIG. 14(a) illustrates the states of the two color spheres 26 in the L*a*b*-color-system color solid 25, and FIG. 14(b) illustrates the color difference LE between the two color spheres 26.

Referring to FIG. 14(a), a color sphere 26A and a color sphere 26B exist in the L*a*b*-color-system color solid 25. The color difference calculation unit 44 calculates the color difference between the color sphere 26A and the color sphere 26B as the color difference ΔE.

Referring to FIG. 14(b), the center of the color sphere 26A is an L*a*b* value 26AQ, and the center of the color sphere 26B is an L*a*b* value 26BQ. Based on the L*a*b* value 26AQ and the L*a*b* value 26BQ, the CPU 2 calculates the color difference ΔE corresponding to a distance between the L*a*b* values 26AQ and the L*a*b* values 26BQ as the color difference calculation unit 44, and displays the color difference ΔE on the display unit 42.

Because ΔE (ΔE*ab) is a square root of a sum of squares of differences of an axis L*, an axis a*, and an axis b*, ΔE (ΔE*ab) is expressed by a color difference equation of (mathematical formula 1).

$$\Delta E^*ab=[(\Delta L^*)^2+(\Delta a^*)^2+(\Delta b^*)^2]^{1/2} \quad \text{(Mathematical formula 1)}$$

The user can manage and analyze the color in units of color spheres 26 by learning the color difference ΔE between the color sphere 26A and the color sphere 26B.

The case that the color difference calculation unit 44 of the color information generation device of the embodiment calculates the color difference ΔE between the two color oval spheres 28 in the Munsell-color-system color solid 27 will be described below.

Figure 15:
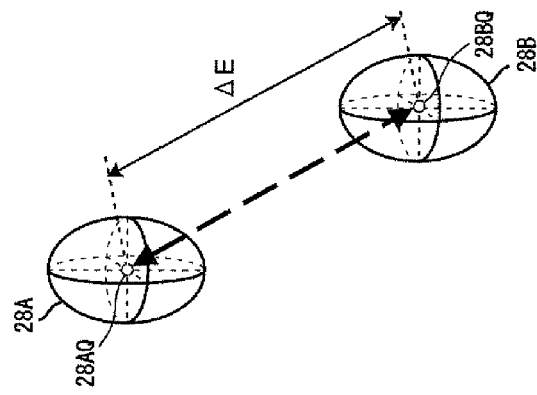
FIG. 15(a) is a view illustrating states of the two color spheres in the Munsell-color-system color solid according to the embodiment of the present invention.
FIG. 15(b) is a view illustrating a color difference of the two color spheres in the Munsell-color-system color solid according to the embodiment of the present invention.
Figure 15:
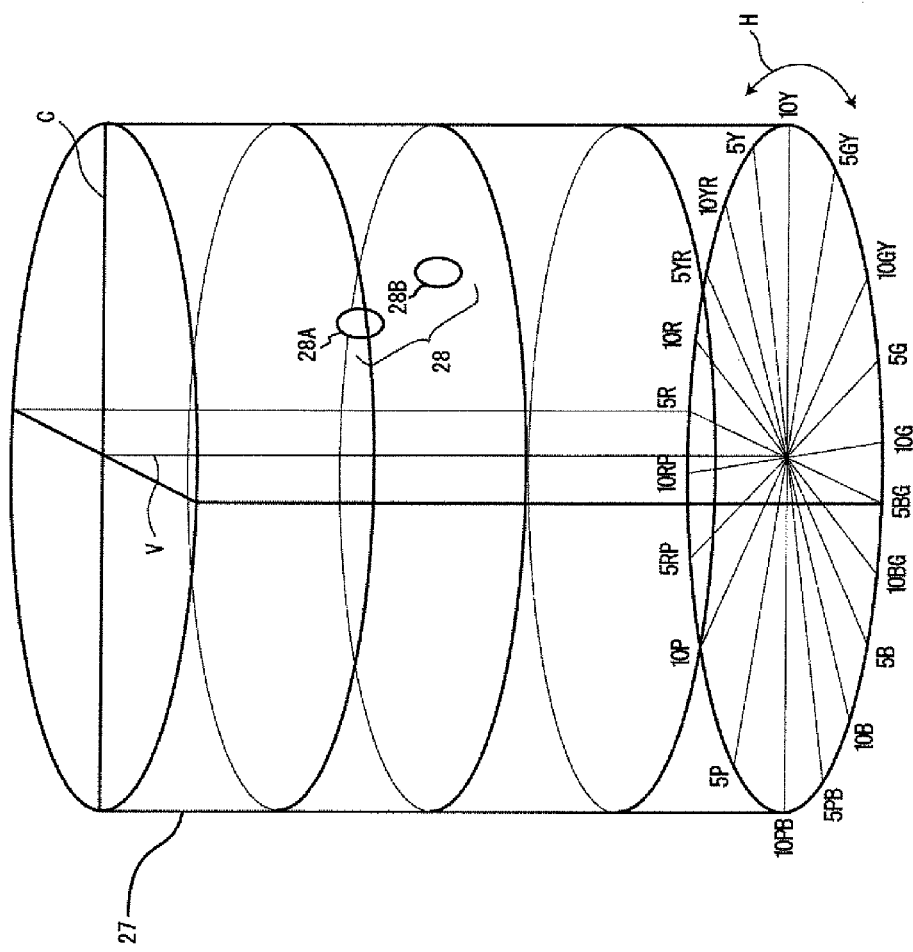

FIGS. 15(a) and 15(b) illustrates states of the two color oval spheres 28 in the Munsell-color-system color solid 27.

Referring to FIG. 15(a), a color oval sphere 28A and a color oval sphere 28B exist in the Munsell-color-system color solid 27. The color difference calculation unit 44 calculates the color difference between the color oval sphere 28A and the color oval sphere 28B as the color difference ΔE.

Referring to FIG. 15(b), the center of the color oval sphere 28A is an HVC value 28AQ, and the center of the color oval sphere 28B is an HVC value 28BQ.

However, the Munsell-color-system color solid is not the uniform color space that is designed such that the distance on the color space is proportional to the color sensation difference, but the hue, lightness, and chroma that are of the three color attributes differ from one another in scale sensation. Therefore, unlike the L*a*b* color system, the color difference cannot be calculated from the distance between two points in the Munsell-color-system color solid.

Accordingly, the CPU 2 that is of the color difference calculation unit 44 tentatively converts the HVC value 28AQ and the HVC value 28BQ into the L*a*b* values, calculates the color difference ΔE using the color difference equation of (mathematical formula 1), and displays the color difference ΔE on the display unit 42.

The user can manage and analyze the color in units of color oval spheres 28 by learning the color difference LE between the color oval sphere 28A and the color oval sphere 28B.

Figure 16:
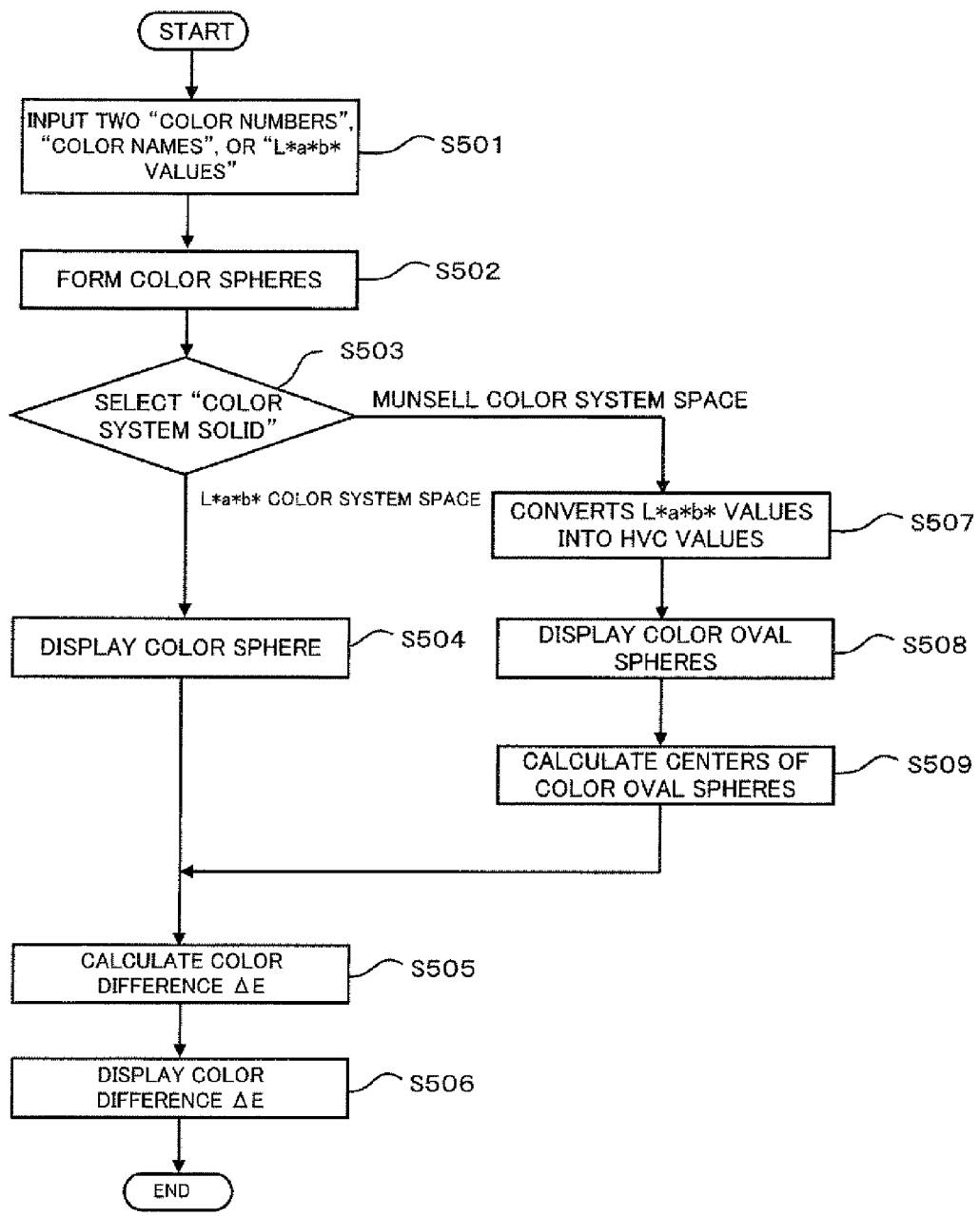
FIG. 16 is a flowchart of color difference calculating processing in which a color difference calculation unit according to the embodiment of the present invention calculates the color difference.

FIG. 16 illustrates a flow of color difference calculating processing in which the color difference calculation unit 44 calculates the color difference ΔE in the L*a*b*-color-system color solid 25 or the Munsell-color-system color solid 27.

Referring to FIG. 16, for example, in the color difference calculation unit 44, the L*a*b* value 26AQ and L*a*b* value 26BQ that become the centers of the color sphere 26A and color sphere 26B are assigned through the keyboard 8 or the mouse 9 (S501). When the L*a*b* values 26AQ and the L*a*b* values 26BQ are assigned, the CPU 2 forms the color sphere 26A and the color sphere 26B based on the L*a*b* value 26AQ and the L*a*b* value 26BQ (S502). At this point, the CPU 2 forms the color sphere 26A and the color sphere 26B by performing the pieces of processing in Steps S202 to S215 in FIG. 8, and it is assumed that the color sphere 26A and the color sphere 26B are displayed on the monitor 6.

Then the CPU 2 waits for the selection of the L*a*b*-color-system color solid 25 or Munsell-color-system color solid 27 through the keyboard 8 or the mouse 9 (S503). At this point, in the case that the user desires the color difference, the same color difference ΔE is obtained from either the L*a*b*-color-system color solid 25 or the Munsell-color-system color solid 27.

When the L*a*b*-color-system color solid 25 is selected in Step S503, the CPU 2 displays the L*a*b*-color-system color solid 25 and the pieces of display data of the color sphere 26A and color sphere 26B formed in Step S502 on the monitor 6 (S504). Then the CPU 2 that is of the color difference calculation unit 44 calculates the color difference ΔE between the color sphere 26A and the color sphere 26B based on the L*a*b* value 26AQ and the L*a*b* value 26BQ (S505). The CPU 2 displays the calculated color difference ΔE in the L*a*b*-color-system color solid 25 on the monitor 6 (S506).

On the other hand, when the Munsell-color-system color solid 27 is selected in Step S503, the CPU 2 converts the L*a*b* values 26P constituting the color sphere 26A and color sphere 26B, which are formed in Step S502, into HVC values 28P (S507). The CPU 2 plots the converted HVC values 28P in the Munsell-color-system color solid 27 to display the color oval sphere 28A and the color oval sphere 28B on the monitor 6 (S508).

Then the CPU 2 that is of the color difference calculation unit 44 calculates the center point 28AQ of the color oval sphere 28A and the center point 28BQ of the color oval sphere 28B (S509). At this point, in the case that the color oval sphere is symmetrical, the center point 28AQ and the center point 28BQ are intersection points of long axes M and short axes N in the color oval sphere 28A and the color oval sphere 28B, respectively. For the asymmetrical deformed oval sphere, the center points 28AQ and 28BQ are those in which the L*a*b* value 26AQ and the L*a*b* value 26BQ are converted into the HVC values using a conversion equation, but the center points 28AQ and 28BQ are not necessarily the intersection points of the long axes and the short axes of the deformed oval spheres.

The CPU 2 calculates the color difference 8E between the color oval sphere 28A and the color oval sphere 28B based on the center point 28AQ and the center point 28BQ (S505). The CPU 2 displays the calculated color difference ΔE in the Munsell-color-system color solid 27 on the monitor 6 (S506).

Thus, the color difference calculation unit 44 of the color information generation device of the embodiment calculates the color difference ΔE in the L*a*b*-color-system color solid 25 or the Munsell-color-system color solid 27. Therefore, the user can easily learn the color difference ΔE with respect to the color sphere 26 in the L*a*b*-color-system color solid 25 and the color difference ΔE with respect to the color oval sphere 28 in the Munsell-color-system color solid 27.

Figure 17:
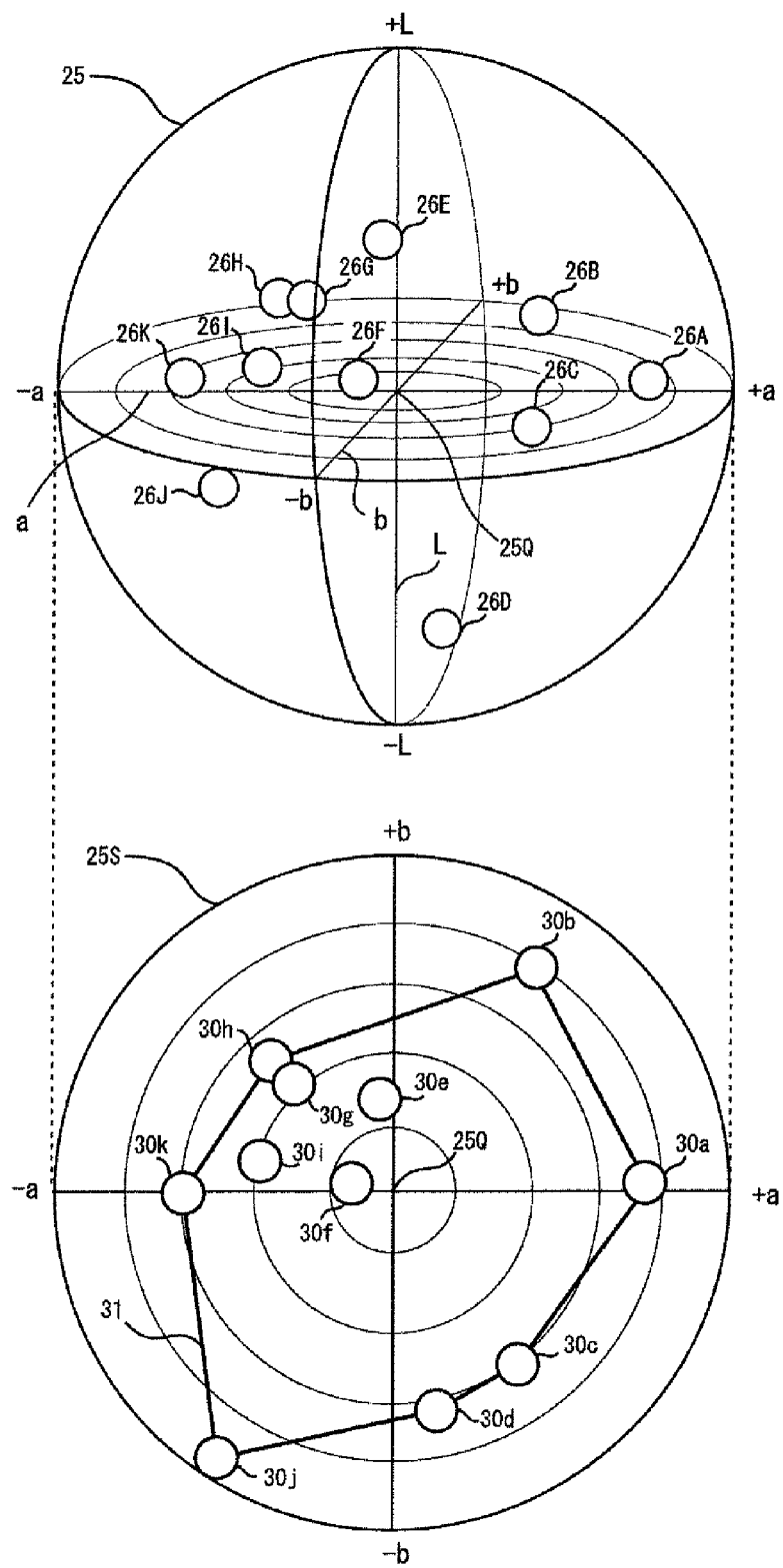
FIG. 17 is a view illustrating a state in which plural color spheres are displayed on a display unit according to the embodiment of the present invention.

The state in which the color sphere 26 is displayed on the monitor 6 will be described below. FIG. 17 illustrates a state in which the plural color spheres 26 are displayed on the monitor 6 that is of the display unit 42.

Referring to FIG. 17, the display data generation unit 40 generates the L*a*b*-color-system color solid 25 and the display data of a projection section 25S to which the color sphere 26 is projected as a projection color sphere 30, and the display data generation unit 40 displays the L*a*b*-color-system color solid 25 and the projection section 25S on the monitor 6.

In the L*a*b*-color-system color solid 25, it is assumed that an a*b* section is the projection section 25S, which is perpendicular to the axis L and includes the intersection point 25Q that is of the intersection point of the axis a, the axis b, and the axis L, it is assumed that an L*b* section is the projection section 25S, which is perpendicular to the axis a and includes the intersection point 25Q, and it is assumed that an L*a* section is the projection section 25S, which is perpendicular to the axis b and includes the intersection point 25Q. At this point, it is assumed that the projection section 258 in FIG. 17 is the a*b* section.

The monitor 6 displays a color sphere 26A to a color sphere 26K in the L*a*b*-color-system color solid 25. The monitor 6 also displays a projection color sphere 30a to a projection color sphere 30k on the projection section 25S. The projection color sphere 30a to the projection color sphere 30k are those in which the color sphere 26A to the color sphere 26K are projected to the projection section 25S. For example, the projection color sphere 30a is one in which the color sphere 26A is projected to the projection section 25S. At this point, the color sphere 26A to the color sphere 26K and the projection color sphere 30a to the projection color sphere 30k are displayed on the monitor 6 in each color based on the RGB value corresponding to the L*a*b* value 26P constituting the color sphere 26.

As illustrated in FIG. 17, an outline 31 indicating an outline of the projection color sphere 30a to projection color sphere 30k displayed on the projection section 25S is displayed on the monitor 6.

When generating the display data of the outline 31 displayed on the monitor 6, the CPU 2 specifies the projection color spheres 30 that exist at the position radially farthest away from the intersection point 25Q in a 360-degree direction centering on the intersection point 25Q. The CPU 2 displays the outline 31 on the monitor 6 by connecting the specified projection color spheres 30 using a straight line.

Thus, the display unit 42 of the color information generation device of the embodiment displays the plural projection color spheres 30 on the projection section 25S while displaying the plural color spheres 26 in the L*a*b*-color-system color solid 25. Therefore, the user can visually understand the positional relationship between the color spheres 26 or the positional relationship between the projection color spheres 30. In the display unit 42, the outline 31 is displayed on the projection section 25S. Therefore, the user can visually understand the range where the displayed projection color sphere 30 exists in the projection section 25S.

Figure 18:
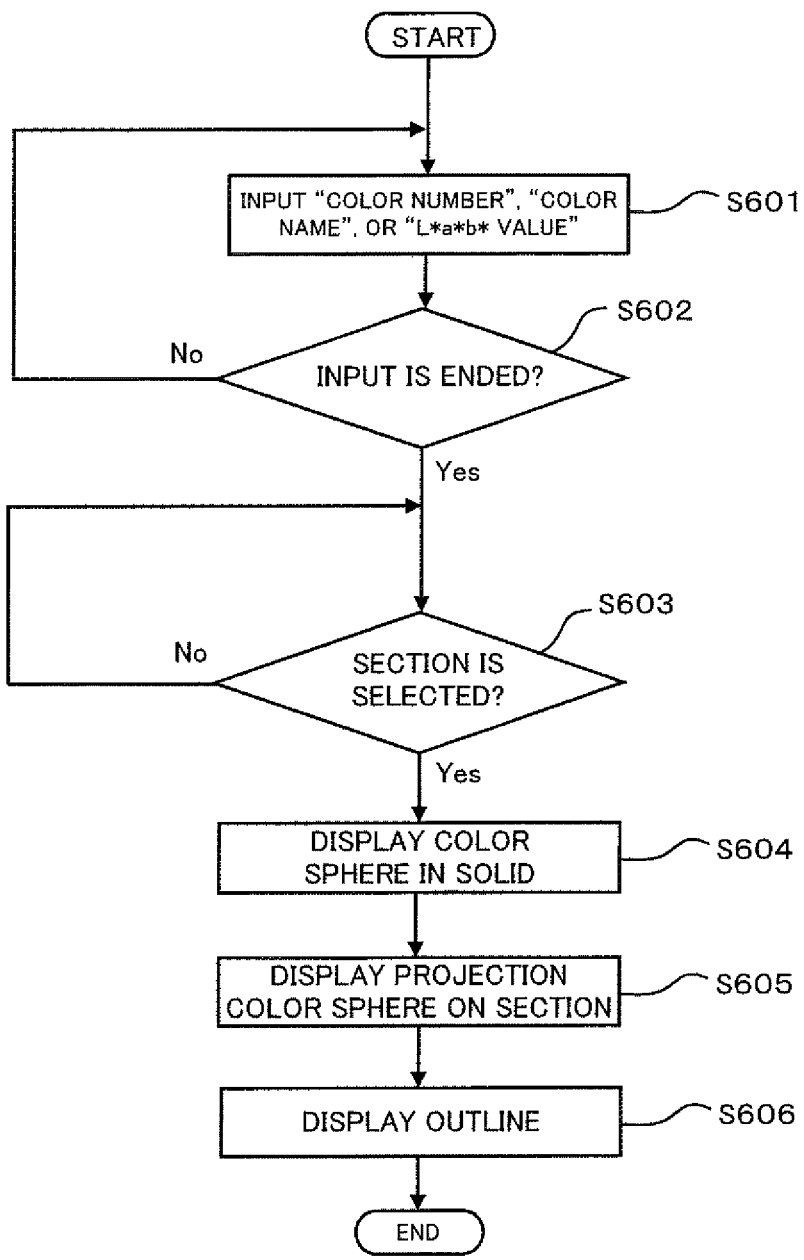
FIG. 18 is a flowchart of projection color sphere display processing in which the display data generation unit according to the embodiment of the present invention generates and displays data for displaying a projection color sphere.

FIG. 18 illustrates a flow of projection color sphere displaying processing, in which the display data generation unit 40 generates the display data of the projection color sphere 30 and displays the projection color sphere 30 on the display unit 42.

Referring to FIG. 18, for example, the color number, the color name, or the L*a*b* value is input to the color information generation device 1 of the embodiment through the keyboard 8 or the mouse 9 (S601). Then the CPU 2 determines whether the input of the color number, color name, or L*a*b* value is ended (S602). At this point, the user can input the plural color numbers, color names, or L*a*b* value to the color information generation device 1 by repeating the processing in Step S601.

When the input of the color number, color name, or L*a*b* value is ended in Step S602 (Yes in S602), the CPU 2 waits for the input of a command to select one of the L*a* section, the L*b* section, and the a*b* section as the projection section 25S through the keyboard 8 or the mouse 9 (S603).

When one of the L*a* section, the L*b* section, and the a*b* section is selected in Step S603, the CPU 2 displays the color sphere 26 in the L*a*b*-color-system color solid 25 on the monitor 6 (S604). Then the CPU 2 projects the color sphere 26 to the projection section 25S selected in Step S603, and displays the projection color sphere 30 on the projection section 25S in the monitor 6 (S605). Then the CPU 2 displays the outline 31 on the projection section 25S in the monitor 6 (S606), and ends the projection color sphere displaying processing.

Thus, in the display unit 42 of the color information generation device of the embodiment, the projection color sphere 30 is displayed on the desired projection section 25S of the user. Therefore, the user visually recognizes the projection color sphere 30 on the plural projection section 25S, so that the color characteristic can finely be analyzed.

Figure 19:
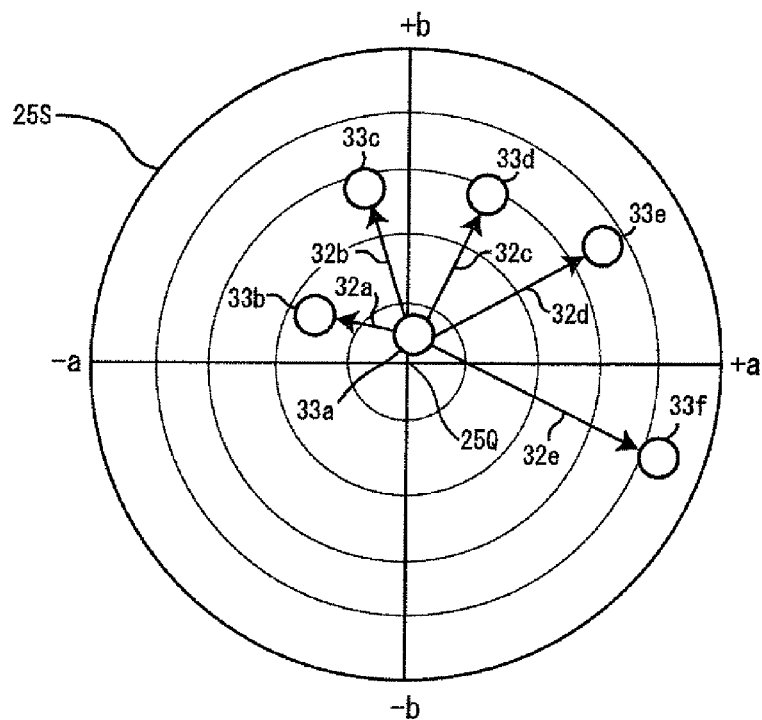
FIG. 19(a) is a view illustrating a state in which vectors are displayed among plural projection color spheres on a projection section in the display unit according to the embodiment of the present invention.
FIG. 19(b) is a view illustrating a state in which vectors are displayed among the projection color spheres on the projection section based on a time series in the display unit according to the embodiment of the present invention.
Figure 19:
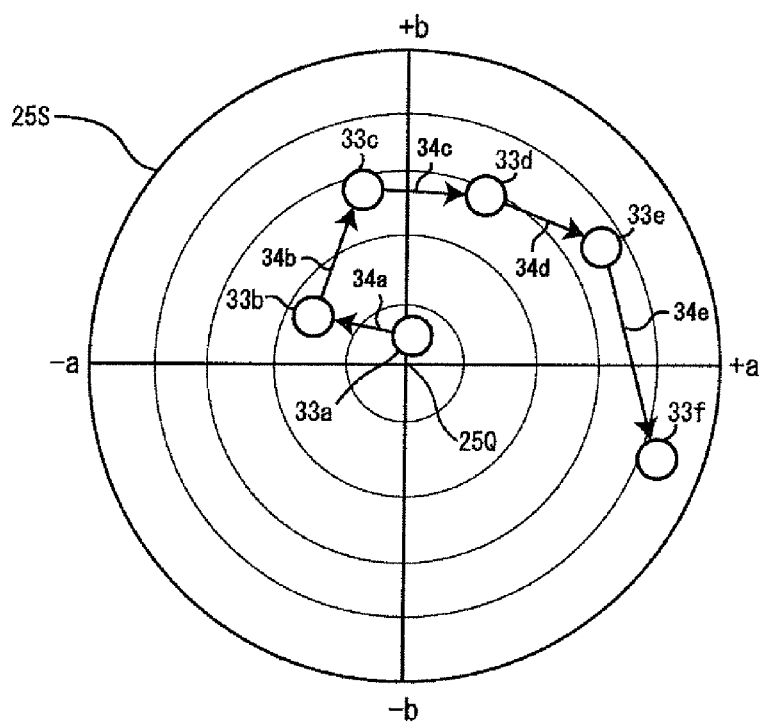

FIGS. 19(a) and 19(b) illustrate states in which vectors are displayed among the plural projection color spheres on the projection section 25S in the monitor 6 that is of the display unit 42.

FIG. 19(a) illustrates the state in which a vector 32a to a vector 32e are displayed with a projection color sphere 33a as a starting point, and FIG. 19(b) illustrates the state in which a vector 34a to a vector 34e are displayed based on a time series of a projection color sphere 33a to a projection color sphere 33f.

At this point, the projection section 25S in FIGS. 19(a) and 19(b) is the a*b* section, and the projection color sphere 33a to the projection color sphere 33f are displayed on the projection section 25S in the monitor 6.

Referring to FIG. 19(a), the projection color sphere 33a is the starting points of the vector 32a to vector 32e, and is arbitrarily assigned by the user. At this point, in the monitor 6, the vector 32a to the vector 32e are displayed from the projection color sphere 33a that becomes the starting point to the projection color sphere 33b to the projection color sphere 33f. For example, the vector 32a is oriented toward the projection color sphere 33b with the projection color sphere 33a as the starting point. The user can learn the direction and distance between the two projection color spheres 33 by visually recognizing the vector 32 from the projection color sphere 33 that becomes the starting point to another projection color sphere 33.

Referring to FIG. 19(b), it is assumed that each of the projection color sphere 33a to the projection color sphere 33f are correlated with date and time. It is assumed that the date and time correlated with the projection color sphere 33a are the oldest, and it is assumed that the date and time correlated with the projection color sphere 33a to the date and time correlated with the projection color sphere 33f are displayed in chronological order.

At this point, the vector 34a to the vector 34e are displayed on the monitor 6 based on the time series of the projection color sphere 33a to the projection color sphere 33f. For example, on the monitor 6, the vector 34a is displayed from the oldest projection color sphere 33a toward the second-oldest projection color sphere 33b, and the vector 34b is displayed from the second-oldest projection color sphere 33b toward the third-oldest projection color sphere 33c. Thus, the monitor 6 displays the vector 34a to the vector 34e based on the date and time correlated with the projection color sphere 33a to the date and time correlated with the projection color sphere 33f. Therefore, the user can learn the time series of the projection color spheres 33 by visually recognizing the vectors 34.

Figure 20:
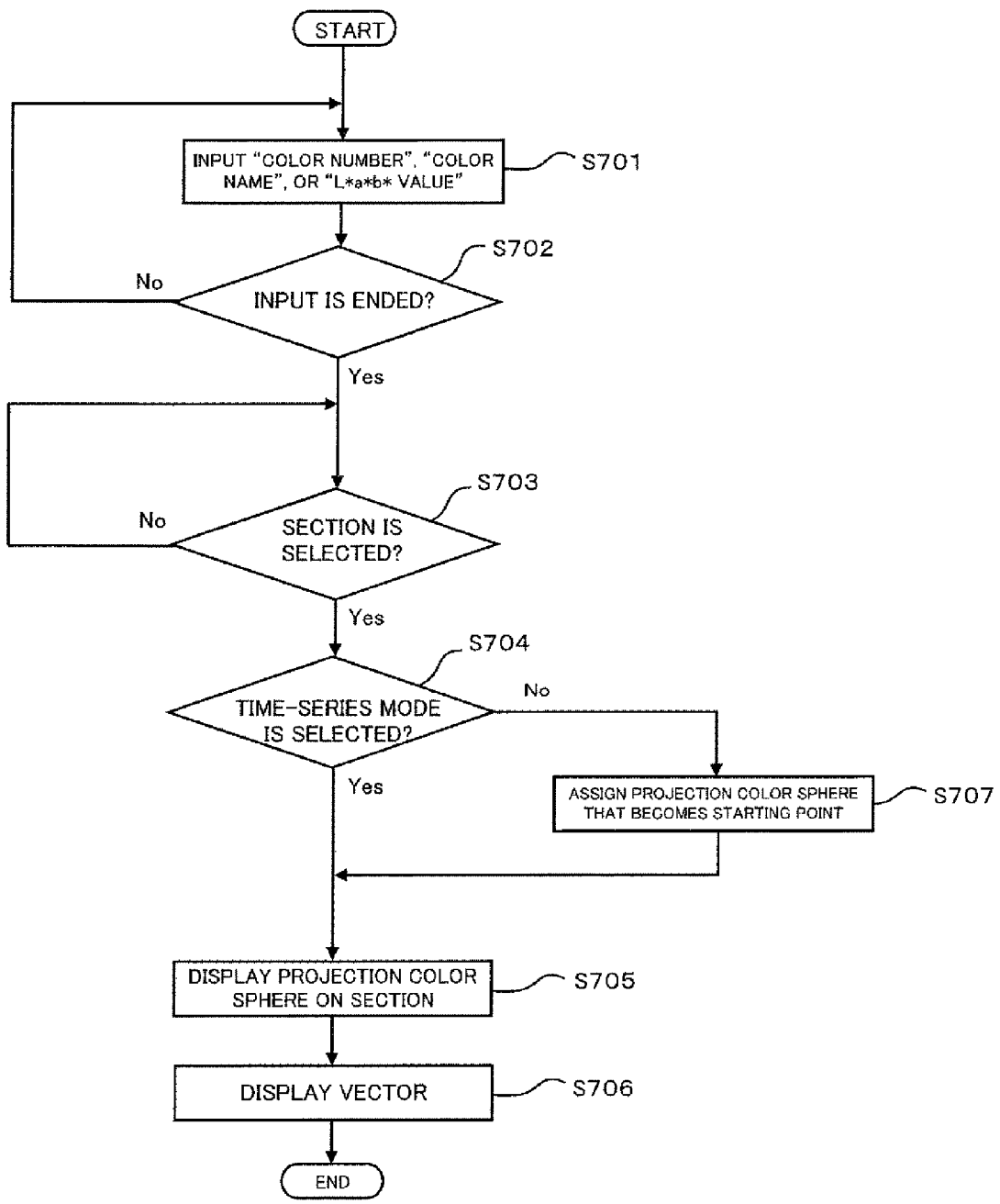
FIG. 20 is a flowchart of vector display processing in which the display data generation unit according to the embodiment of the present invention generates and displays data for displaying the vector between the projection color spheres.
Figure 21:
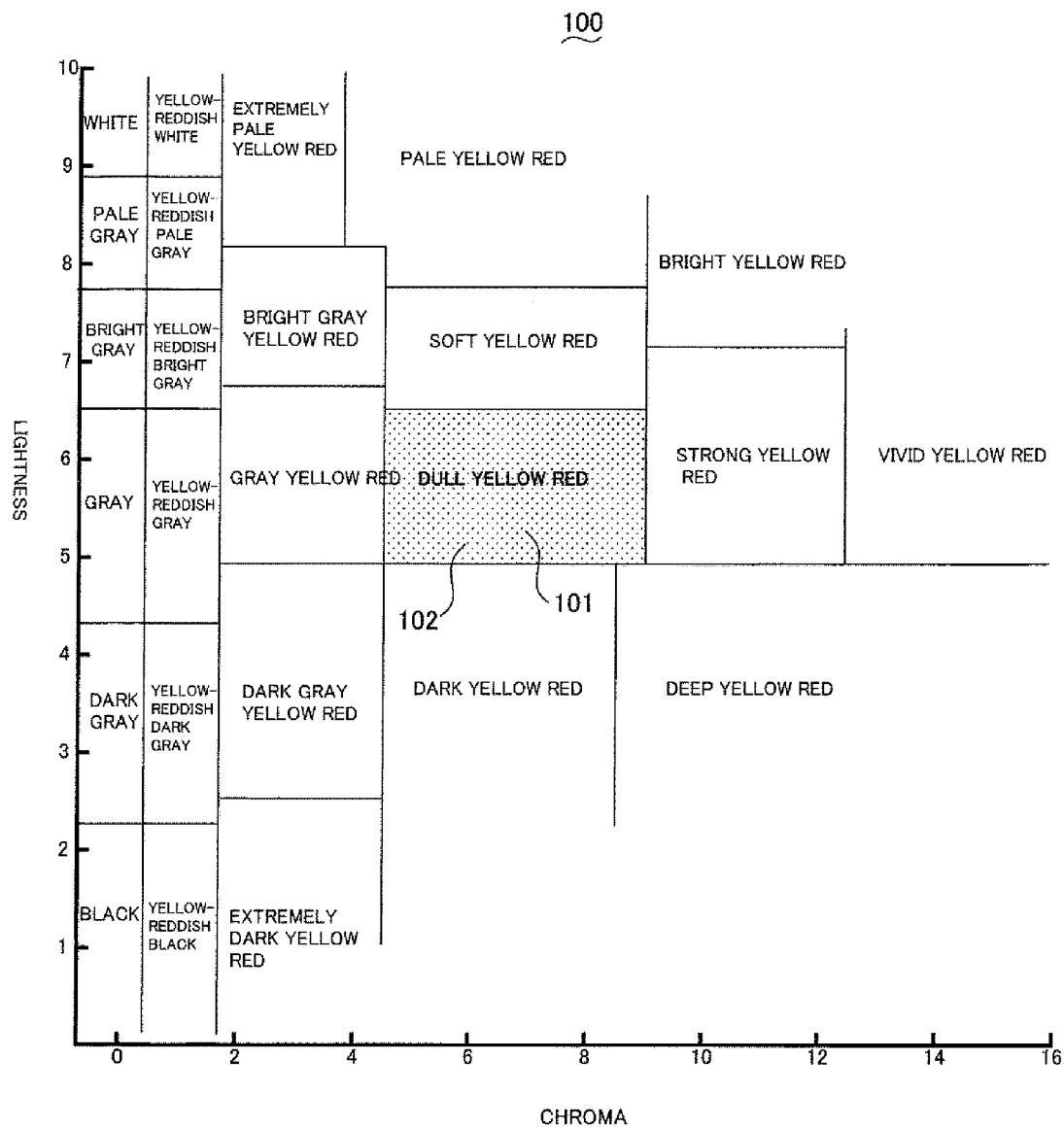
FIG. 21 is a view illustrating an example of a JIS systematic color name table.

FIG. 20 illustrates a flow of vector displaying processing, in which the display data generation unit 40 generates the vector display data between the projection color spheres and displays the vector on the display unit 42.

Referring to FIG. 20, for example, the color number, the color name, or the L*a*b* value is input to the color information generation device 1 of the embodiment through the keyboard 8 or the mouse 9 (S701). Then the CPU 2 determines whether the input of the color number, color name, or L*a*b* value is ended (S702). At this point, the user can input the plural color numbers, color names, or L*a*b* value to the color information generation device 1 by repeating the processing in Step S701.

When the input of the color number, color name, or L*a*b* value is ended in Step S702 (Yes in S702), the CPU 2 waits for the input of the command to select one of the L*a* section, the L*b* section, and the a*b* section as the projection section 25S through the keyboard 8 or the mouse 9 (S703).

When one of the L*a* section, the L*b* section, and the a*b* section is selected in Step S703, the CPU 2 waits for selection of a time-series mode in which the vector is displayed based on the date and time correlated with the projection color sphere 33 (S704).

When the time-series mode is selected through the keyboard 8 or the mouse 9 in Step S704 (Yes in S704), the CPU 2 displays the projection section 25S on the monitor 6, and displays the projection color sphere 33 on the projection section 25S (S705). Then the CPU 2 displays the vector 34 on the projection section 25S based on the date and time correlated with the projection color sphere (S706).

On the other hand, when the time-series mode is not selected in Step S704 (No in S704), the user assigns the projection color sphere 33 that becomes the starting point of the vector 32 (S707). At this point, it is assumed that the user selects the projection color sphere 33a.

Then the CPU 2 displays the projection section 25S on the monitor 6, and displays the plural projection color spheres 33 including the projection color sphere 33a on the projection section 25S (S705). The CPU 2 displays the vector 32 on the projection section 25S from the projection color sphere 33a assigned in Step S707 toward the projection color sphere 33 except the projection color sphere 33a (S706).

Thus, in the display unit 42 of the color information generation device of the embodiment, the vector 32 or 34 is displayed on the projection section 25S according to the desired displaying method of the user. Therefore, the user can learn the color characteristic according to the intended use by visually recognizing the vector 32 or 34 displayed on the projection section 25S.

As described above, the color information generation device 1 of the embodiment retains the color-difference sensation level table 24, which allows the user to strictly and easily manage the color attribute information.

The attribute calculation unit 43 performs the recording processing of recording the attribute information in the color database 12. Therefore, the user can correlate the color number, the color name, the L*a*b* value, the HVC value, the XYZ value, the RGB value, and the sphere radius with one another, and can easily produce the color database 12 in which the color number, the color name, the L*a*b* value, the HVC value, the XYZ value, the RGB value, and the sphere radius are correlated with one another.

The monitor 6 that is of the display unit 42 displays the color sphere 26 or color oval sphere 28 in the L*a*b*-color-system color solid 25 or Munsell-color-system color solid 27 that is displayed by the line drawing. Therefore, the user can understand the color characteristics in the L*a*b*-color-system color solid 25 or Munsell-color-system color solid 27.

The color information generation device of the embodiment also performs the color searching processing based on the search conditions input to the color search screen 29. Therefore, the user can easily search the color.

The monitor 6 displays the color difference ΔE between the two color spheres 26 or between the two color oval spheres 28 and the vector 32 or 34 between the two projection color spheres 30. Therefore, the user can learn the relationship between the two colors and the characteristics of the colors.

Thus, the color information generation device of the present invention displays various color systems in the planar or stereoscopic manner, so that the spatial characteristic of the color attribute can easily be understood.

The present invention is not limited to the embodiment, but various modification can be made without departing from the scope of the present embodiment.

For example, the color information generation device 1 of the embodiment is configured to separately include the main storage unit 4 and the color data storage unit 13. Alternatively, for example, the main storage unit 4 may be configured such that the color database 12 and the color-difference sensation level table 24 are stored therein. The color database 12 may be configured such that, in addition to the color number item 12a, the color name item 12b, the L*a*b*-value item 12c, the HVC-value item 12d, the XYZ-value item 12e, the RGB-value item 12f, and the sphere-radius item 12g, pieces of additional information, such as the date and time and a supplemental explanation, are retained while correlated with one another. The color information generation device 1 may be configured such that the L*a*b*-color-system color solid 25 or Munsell-color-system color solid 27 that is displayed on the monitor 6 is vertically or horizontally rotated.

Using the color information generation device of the present invention, the color range is displayed on the plural color solids according to application. Therefore, the color management of products, such as an automobile and apparel clothing, which have plural colors, and products, such as a cosmetic, in which approximate colors are integrated in a narrow range, is intuitively and easily performed.

By the way, the program of the invention which relates to the present invention is a program for causing a computer to execute the operations of at least the inputting step and the display data generating step of the above-described color information generation method and is a program which operates in cooperation with the computer.

Moreover, the recording medium of the present invention is a program recording medium having recorded thereon a program for causing a computer to execute the operations of at least the inputting step and the display data generating step of the above-described color information generation method and is a computer-readable recording medium, the program of which, when read, is used in cooperation with the computer.

Moreover, the above-mentioned "operation of the step" of the present invention means the operation of all or a part of the step.

Moreover, in one use form of the program of the invention which relates to the present invention, the program may be recorded in the recording medium such as ROM readable by the computer, and operate in cooperation with the computer.

Moreover, in another use form of the program of the invention which relates to the present invention, the program may be transmitted across the transmission media such as the Internet etc., or through the transmission media such as light, electric wave etc., read by the computer and operate in cooperation with the computer.

Moreover, the computer according to the present invention described above is not limited to the pure hardware such as CPU, but may include a firmware, OS, or peripheral devices.

Incidentally, in the present embodiment, the color information generation device of the present invention may be implemented by software or hardware.

INDUSTRIAL APPLICABILITY

The color information generation device and color information generation method of the present invention have the effect to be able to easily understand the spatial characteristic of the color attribute by sterically displaying the color attribute information, and the color information generation device and color information generation method are useful to the color information generation device and color information generation method for generating and displaying the display data displaying the color attribute information.

DESCRIPTION OF REFERENCE SIGNS

1 Color information generation device
2 CPU
3 Control program
4 Main storage unit
5 Monitor controller
6 Monitor
7 Input-means controller
8 Keyboard
9 Mouse
10 Colorimeter
11 Input means
12 Color database 12a Color number item
12b Color name item
12c L*a*b*-value item
12d HVC-value item
12e XYZ-value item
12f RGB-value item
12g Sphere-radius item
13 Color data storage unit
14 USB controller
15 USB terminal
16 Communication controller
17 Communication line terminal
18 Memory card controller
19 Memory card slot
20 Power controller
21 Power switch
22 Bus
23 Conversion table
24 Color-difference sensation level table
24a ΔE range item
24b Sensation grade item
24c Color-difference sensation level item
24d Sphere-radius item
L*a*b*-color-system color solid
25Q Intersection point
25S Projection section
26, 26A-26K Color sphere
26AQ, 26BQ, 26P, 26Q L*a*b* values
26T Tentative color sphere
27 Munsell-color-system color solid
28, 28A, 28B Color oval sphere
28AQ, 28BQ, 28Q Center point (HVC values)
28P HVC values
29 Color search screen
29a Color number input item
29b Color name input item
29c Display type item
29d Search range item
29e Search button
29f Result display window
30, 30a-30k Projection color sphere
31 Outline
32, 32a-32e Vector
33, 33a-33f Projection color sphere
34, 34a-34e Vector
40 Display data generation unit
41 Input unit
42 Display unit
43 Attribute calculation unit
44 Color difference calculation unit
50 Color-difference sensation level table
50a ΔE range item
50b Sensation grade item
100 JIS systematic color name table
101 JIS systematic color name
102 Color area

What is claimed is:

1. A color information generation device comprising:
a color database in which a mutual correlation is established among an L*a*b*-color-system L*a*b* value as an attribute with respect to a color stimulus, an RGB value as an attribute with respect to a computer color, and a sphere radius which is proportional to a color difference and is set in advance as a value indicating a level at that a person can sensuously distinguish between colors, the sphere radius being a radius of a color sphere having the L*a*b* value as a center point in an L*a*b*-color-system color solid;
an input unit to which the L*a*b* value or the RGB value is input;
a display data generation unit which refers to the color database to generate display data in which the color sphere having a center point of the L*a*b* value that is input to the input unit or the L*a*b* value correlated with the RGB value that is input to the input unit is disposed in the L*a*b*-color-system color solid of a line drawing, the color sphere having the correlated sphere radius and being colored at least on a surface; and
a display unit which displays the display data generated by the display data generation unit, wherein
an inside of the color sphere generated by the display data generation unit is colored, and
the display data generation unit forms a tentative color sphere having the sphere radius with the center point, converts the plural RGB values, which are between a predetermined lower limit value or more and a predetermined upper limit value or less, into the L*a*b* values respectively, judges whether the converted L*a*b* values exist within the tentative color sphere respectively or not, and sets a cluster of the L*a*b* values which exist within the tentative color sphere as display data of the color sphere.

2. The color information generation device according to claim 1, wherein
in the color database, an attribute with respect to one or a plurality of colors, which is selected from a group of a color name, a color number, XYZ values of an XYZ-color-system and HVC values of a Munsell-color-system, is correlated with the L*a*b* value or the RGB value, and
the display data generation unit converts each of the L*a*b* values which are judged to exist within the tentative color sphere into another attribute, and generates display data in which the converted attribute is disposed in a color-system color solid with respect to the attribute.

3. The color information generation device according to claim 2, wherein
a color-system color solid, which is displayed by the display unit, with respect to the converted attribute can be rotated and zoomed.

4. The color information generation device according to claim 1, wherein
in the color database, a Munsell-color-system HVC value as an attribute with respect to color is correlated with the L*a*b* value or the RGB value, and
the display data generation unit converts the L*a*b* values which are judged to exist within the tentative color sphere into the HVC values respectively, makes a color oval sphere of a cluster of the converted HVC values, and generates display data in which the color oval sphere is disposed in a Munsell-color-system color solid.

5. The color information generation device according to claim 4, comprising:
a color difference calculation unit which calculates a color difference between two pieces of the color spheres, wherein
in case an instruction for calculating a distance between a first color oval sphere and a second color oval sphere is input to the input unit, when the display unit is displaying the Munsell-color-system color solid, the first color oval sphere as the color oval sphere, and a second color oval sphere as the color oval sphere, the color difference calculation unit converts a HVC value of a center point of the first color oval sphere and a HVC value of a center point of the second color oval sphere into L*a*b* values respectively, and calculates a distance between the two L*a*b* values as the color difference between the first color oval sphere and the second color oval sphere.

6. A color information generation device comprising:

a color database in which a mutual correlation is established among an L*a*b*-color-system L*a*b* value as an attribute with respect to a color stimulus, an RGB value as an attribute with respect to a computer color, and a sphere radius which is proportional to a color difference and is set in advance as a value indicating a level at that a person can sensuously distinguish between colors, the sphere radius being a radius of a color sphere having the L*a*b* value as a center point in an L*a*b*-color-system color solid;

an input unit to which the L*a*b* value or the RGB value is input; and a display data generation unit which refers to the color database to generate display data in which the color sphere having a center point of the L*a*b* value that is input to the input unit or the L*a*b* value correlated with the RGB value that is input to the input unit is disposed in the L*a*b*-color-system color solid of a line drawing, the color sphere having the correlated sphere radius and being colored at least on a surface, wherein the display data generation unit specifies any one of an L*a* section, an L*b* section, and an a*b* section as a projection section, and generates display data in which a projection color sphere is disposed on the projection section by projecting one or a plurality of the color spheres to the projection section, and when two or more pieces of the projection color spheres are disposed on the projection section, the display data generation unit generates a display data which indicates a vector that is oriented to another one of the projection color spheres from one of the projection color spheres.

* * * * *